(12) United States Patent
Fukuhara et al.

(10) Patent No.: US 8,605,793 B2
(45) Date of Patent: Dec. 10, 2013

(54) INFORMATION PROCESSING DEVICE AND METHOD, AND PROGRAM

(75) Inventors: Takahiro Fukuhara, Kanagawa (JP); Kazuhisa Hosaka, Tokyo (JP); Akira Sugiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 1467 days.

(21) Appl. No.: 11/846,808

(22) Filed: Aug. 29, 2007

(65) Prior Publication Data

US 2008/0089406 A1   Apr. 17, 2008

(30) Foreign Application Priority Data

Oct. 16, 2006   (JP) ................................. 2006-281302

(51) Int. Cl.
*H03D 3/24*   (2006.01)
(52) U.S. Cl.
USPC ................................. 375/240.26; 375/240.28
(58) Field of Classification Search
USPC ........................................ 375/240.24–240.27
See application file for complete search history.

(56) References Cited

U.S. PATENT DOCUMENTS

| | | | | |
|---|---|---|---|---|
| 5,418,620 A | * | 5/1995 | Nishino et al. | 386/337 |
| 5,729,706 A | * | 3/1998 | Terane | 710/316 |
| 2004/0062311 A1 | * | 4/2004 | Hashino et al. | 375/240.16 |
| 2005/0175250 A1 | * | 8/2005 | Watanabe et al. | 382/247 |
| 2005/0193046 A1 | * | 9/2005 | Malik et al. | 708/300 |
| 2006/0223628 A1 | * | 10/2006 | Walker et al. | 463/20 |
| 2006/0227249 A1 | * | 10/2006 | Chen et al. | 348/631 |
| 2007/0081593 A1 | * | 4/2007 | Jeong et al. | 375/240.19 |

FOREIGN PATENT DOCUMENTS

| | | |
|---|---|---|
| JP | 5-153550 | 6/1993 |
| JP | 6-292179 | 10/1994 |
| JP | 11-75184 | 3/1999 |
| JP | 2004-104694 | 4/2004 |
| JP | 2005-39714 | 2/2005 |
| JP | 2006-60792 | 3/2006 |

\* cited by examiner

*Primary Examiner* — Eleni Shiferaw
*Assistant Examiner* — Abu Sholeman
(74) *Attorney, Agent, or Firm* — Oblon, Spivak, McClelland, Maier & Neustadt, L.L.P.

(57) ABSTRACT

An information processing device configured to process moving image data includes a plurality of calculating units configured to transform a frame rate by subjecting two pieces of frame data to addition and subtraction; and a control unit configured to control the plurality of calculating units to subject each frame data of the moving image data to at least one of the addition and the subtraction by the number of times necessary for transforming the frame rate of the moving image data into a desired rate.

12 Claims, 27 Drawing Sheets

FIG. 5

| 0LL | 1HL | 2HL | 3HL |
| 1LH | 1HH | | |
| 2LH | | 2HH | |
| 3LH | | | 3HH |

FIG. 12

| 240p (1) | 240p (2) | 240p (3) | 240p (4) | 240p (5) | 240p (6) | 240p (7) | 240p (8) |
|---|---|---|---|---|---|---|---|
| 120p PLAYBACK (1) + (2) || 120p PLAYBACK (3) + (4) || 120p PLAYBACK (5) + (6) || 120p PLAYBACK (7) + (8) ||
| 60p PLAYBACK (1) + (2) + (3) + (4) |||| 60p PLAYBACK (5) + (6) + (7) + (8) ||||

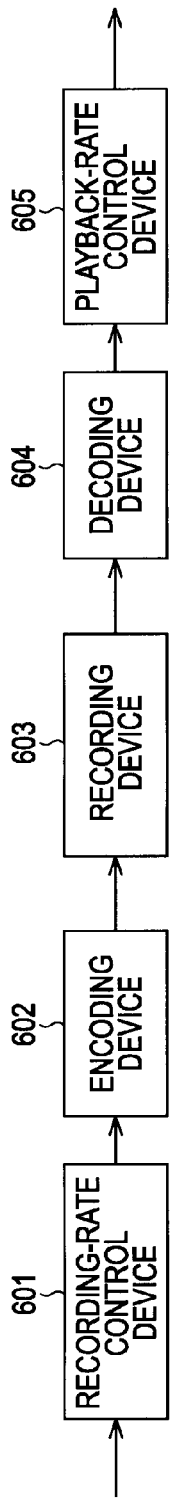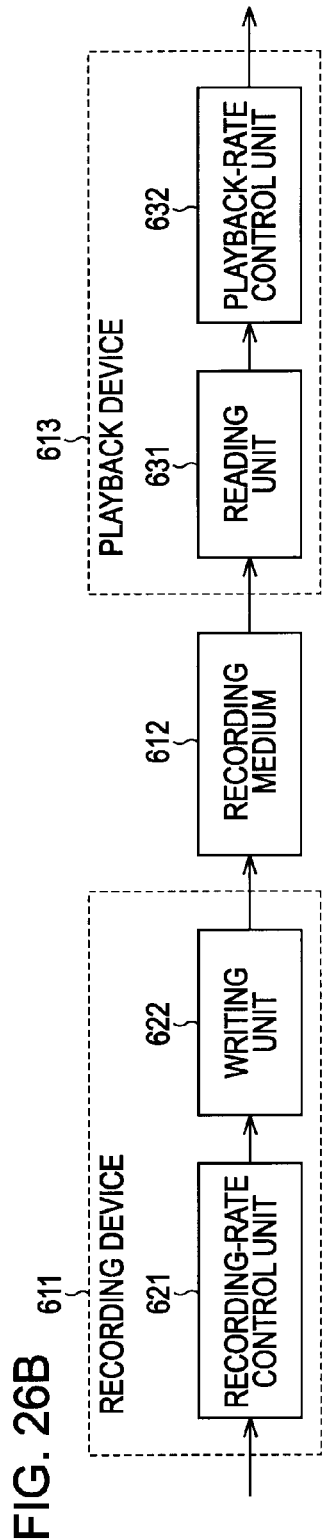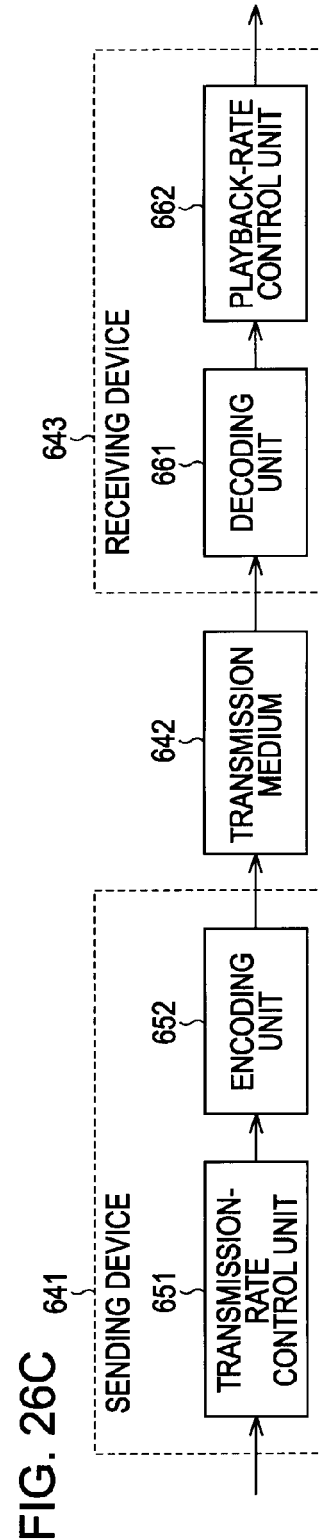

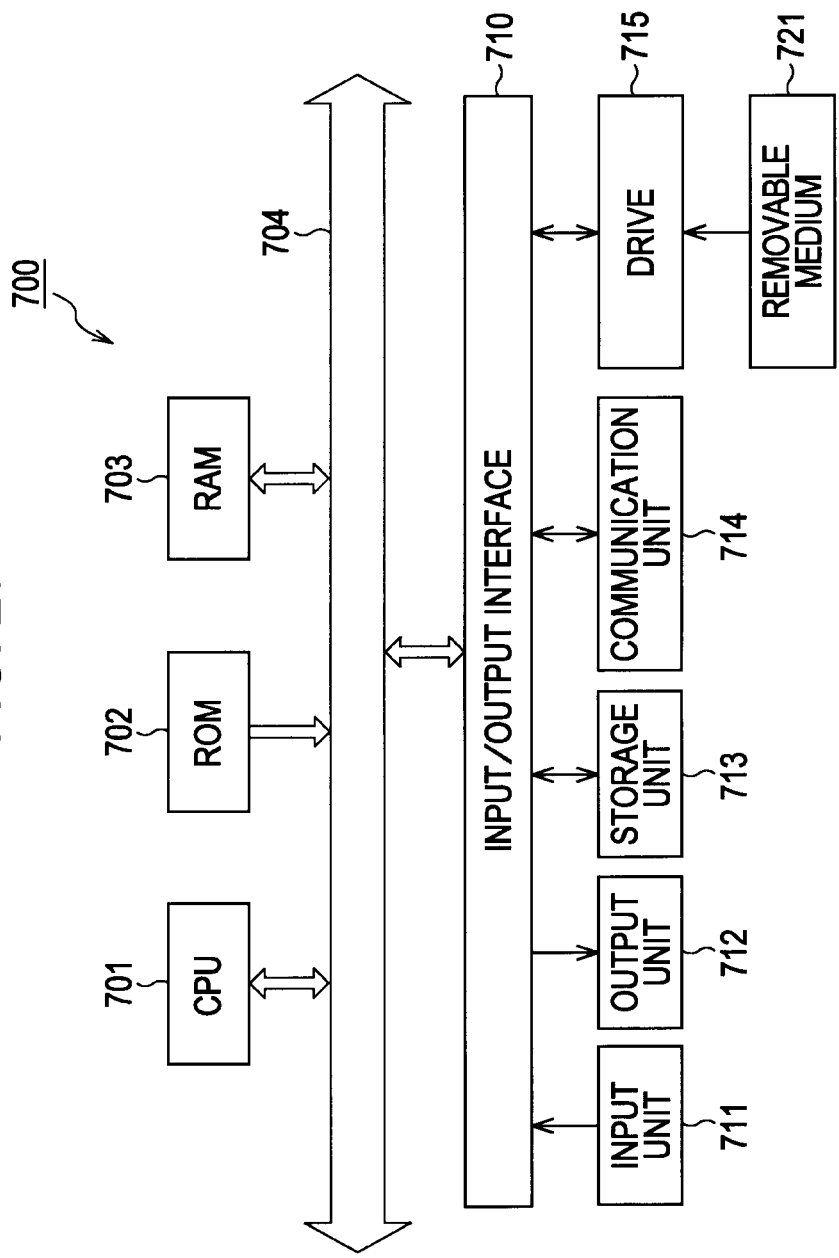

INFORMATION PROCESSING DEVICE AND METHOD, AND PROGRAM

CROSS REFERENCES TO RELATED APPLICATIONS

The present invention contains subject matter related to Japanese Patent Application JP 2006-281302 filed in the Japanese Patent Office on Oct. 16, 2006, the entire contents of which are incorporated herein by reference.

BACKGROUND OF THE INVENTION

1. Field of the Invention

The present invention relates to an information processing device and method, and a program, and particularly relates to an information processing device and method, and a program, whereby a moving image having a high frame rate can be readily subjected to variable playback.

2. Description of the Related Art

Existing typical image compression systems include the MPEG (Moving Picture Experts Group) system, the JPEG (Joint Photographic Experts Group) system, and so forth, which have been standardized by ISO (International Standards Organization).

Of the MPEG system, a system called MPEG-2 has been employed for compressing an HDTV (High Definition Television) interlaced moving image in BS (Broadcasting Satellite) digital broadcasting, which the Japanese public has become accustomed to. Also, contents to be recorded in a DVD (Digital Versatile Disc) medium and sold are also compressed and encoded by this MPEG-2 system.

A TV (Television) signal is configured of images of 30 frames (60 fields) per one second, but it has been pointed out that with the number of images being of such a level, the reproducibility of a high-speed moving object is poor. Therefore, in recent years, the need of handling moving images with a frame rate several times thereof, for example, a moving image having a high frame rate of 120 frames per second to 240 frames per second, has been increasing.

However, increasing the frame rate several fold increases the data rate proportionately, so it becomes difficult to perform encoding processing on the fly (in real time) without delay, and particularly, there has been the possibility that realization of hardware, which can encode in real time with the MPEG system using inter frame compression, might turn out to be impractical due to problems such as cost.

In order to avoid such a problem, a method has been disclosed wherein a plurality of codecs of an intra encoding system are arrayed, and compression encoding is performed with time sharing (e.g., Japanese Unexamined Patent Application Publication No. 2004-104694).

With Japanese Unexamined Patent Application Publication No. 2004-104694, in order to encode a moving image in high efficiency, such as 525/60 p (a progressive image of which the horizontal resolution is 525 lines, and the frame rate is 60 frames per second), 1080/60 p (a progressive image of which the horizontal resolution is 1080 lines, and the frame rate is 60 frames per second), and so forth, a technique has been disclosed wherein the sum signal and difference signal of image signals between frames are extracted every two frames, and each of the extracted signals is encoded, thereby controlling the ratio between the coding bit rate of the sum signal and the coding bit rate of the difference signal.

SUMMARY OF THE INVENTION

However, with the technique disclosed in Japanese Unexamined Patent Application Publication No. 2004-104694, the application of a frame rate higher than an ordinary frame rate (e.g., 60 frames per second), is basically not taken into consideration, so the higher the frame rate of contents is, the possibility that encoding in real time might become difficult increases, as with the case of encoding using one encoder.

Also, even in the event of decoding and playing compressed and encoded contents having a high frame rate, all that can be done is returning to the frame rate before compression, and in the event of performing control of a playback rate or playback speed, it is necessary to perform these control processing again, which prevents the processing from being readily performed.

It has been found desirable to enable a moving image having a high frame rate to be readily subjected to variable playback.

An information processing device according to an embodiment of the present invention is an information processing device configured to process moving image data including a plurality of calculating units configured to transform a frame rate by subjecting two pieces of frame data to addition and subtraction, and a control unit configured to control the plurality of calculating unit to subject each frame data of the moving image data to at least one of the addition and the subtraction by the number of times necessary for transforming the frame rate of the moving image data into a desired rate.

The plurality of calculating units may be mutually serially connected, with the calculating unit of the second stage and thereafter being configured to add or subtract to or from the calculation results of the calculating unit of the preceding stage. The control unit may control the calculating unit of the first stage through a stage where the moving image data of a desired frame rate is obtained, of the plurality of calculating units serially connected, to perform at least one of the addition and the subtraction.

Of the plurality of calculating unit serially connected, the calculating units of the first stage may be configured to subject moving image data of which the frame rate is decreased due to the addition and the subtraction, to at least one of the addition and the subtraction. Each calculating units may perform at least one of the addition and the subtraction, whereby the frame rate can be transformed to double.

The calculating unit may perform at least one of the addition and the subtraction multiple times in parallel, whereby a plurality of calculation results can be generated concurrently.

The information processing device according to an embodiment of the present invention may further comprise: a decoding unit configured to decode a code stream which is the encoded moving image data. The plurality of calculating units may subject each frame data of the moving image data, which is obtained by being controlled by the control unit, and decoded by the decoding unit, to at least one of the addition and the subtraction.

The decoding unit may decode the code stream at the speed corresponding to the frame rate of moving image data obtained with the calculation of the plurality of calculating units.

The decoding unit may include an entropy decoding unit configured to generate a quantized coefficient from the code stream, an inverse quantizing unit configured to transform the quantized coefficient to generate a predetermined filter factor, and an inverse filtering unit configured to subject the filter factor to inverse filtering to generate a decoded image.

The entropy decoding unit may decode each of the code stream of an addition image, and the code stream of a subtraction image mutually in an independent manner in order such as generating a quantized coefficient from the most significant bit position to a lower bit direction.

The entropy decoding unit may integrate the code stream of an addition image, and the code stream of a subtraction image, and decode the overall of the integrated code stream in order such as generating a quantized coefficient from the most significant bit position to a lower bit direction.

The entropy decoding unit may decode the code stream so as to generate the quantized coefficient of the same bit position in order from the sub band of the lowest level toward the sub band of the highest level.

The entropy decoding unit may decode the code stream so as to generate the quantized coefficient of the same bit position in order from a brightness component to a color difference component.

An information processing method according to an embodiment of the present invention is an information processing method arranged to process moving image data including the steps of: transforming, with a plurality of calculations, a frame rate, by subjecting two pieces of frame data to addition and subtraction; and controlling the plurality of transforming to subject each frame data of the moving image data to at least one of the addition and the subtraction by the number of times necessary for transforming the frame rate of the moving image data into a desired rate.

According to an embodiment of the present invention, information can be processed. Particularly, a moving image having a high frame rate can be readily subjected to variable playback.

BRIEF DESCRIPTION OF THE DRAWINGS

FIG. 5 is a schematic view illustrating a configuration example of sub bands;

FIG. 12 is a schematic view describing an example of a situation of control of a playback rate;

FIG. 26 is a block diagram illustrating another configuration example of the image processing system; and FIG. 27 is a block diagram illustrating a configuration example of a personal computer to which an embodiment of the present invention is applied.

DESCRIPTION OF THE PREFERRED EMBODIMENTS

Description will be made below regarding an embodiment of the present invention.

Figure 1:
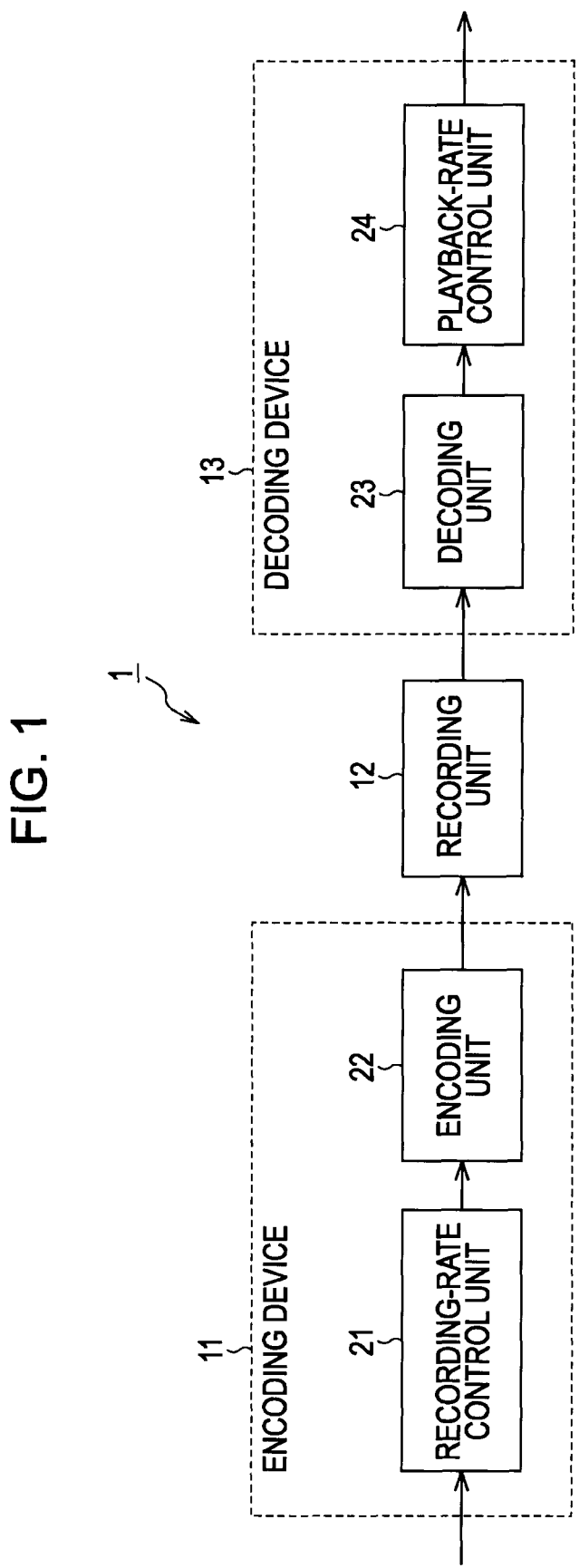
FIG. 1 is a block diagram illustrating a configuration example of an image processing system to which an embodiment of the present invention is applied.

FIG. 1 is a block diagram illustrating a configuration example of an image processing system to which an embodiment of the present invention is applied. In FIG. 1, an image processing system 1 is a system wherein moving image data is compressed and encoded on the fly (in real time) without great delay, and recorded, and as necessary the moving image data thereof is read out on the fly (in real time) without great delay, and played. The image processing system 1 includes an encoding device 11, a recording unit 12, and a decoding device 13.

The encoding device 11 is a device which compresses and encodes moving image data in real time, which is input in real time. That is to say, the encoding device 11 includes compression encoding processing capability which is faster than the input speed of moving image data (i.e., a frame rate as data), and compresses and encodes moving image data at a processing speed substantially faster than the input speed thereof, and outputs a code stream to the recording unit 12.

Now, the amount of data in the case of indicating size and density as data will be referred to as "rate", and the amount of data in the case of indicating speed such as processing or the like will be referred to as "speed". For example, a value showing how many frames a playback moving image which is moving image data is made up of per second will be referred to as a frame rate, and the amount of data (bit) per one second of playback time of moving image data will be referred to as a bit rate. On the other hand, for example, of moving image data, the number of frames to be input for one second will be referred to as input speed, and the number of frames to be compressed and encoded for one second will be referred to as compression encoding speed. Also, for example, of a bit stream, the number of frames to be output for one second (the number of frames when converting into corresponding moving image data) will be referred to as output speed.

Incidentally, in the case of the encoding device 11 in FIG. 1, input speed is identical to frame rate of moving image data to be input, and output speed is identical to compression encoding speed.

Also, "great delay" means delay due to the compression encoding speed (i.e., output speed) being slower than the input speed of moving image data. For example, while the time from input start to input end of moving image data is ten seconds, in the case such that the time from output start to output end of a code stream is 15 seconds, the five seconds which is the time difference between input and output will be referred to as "great delay".

On the other hand, short time such as the processing execution time of compression encoding, or that generated due to the arrangement of the processing thereof, e.g., from input of moving image data being started to output of a code stream being started, is not included in "great delay". That is to say, for all practical purposes, we will consider minute time delay in a case wherein encoding is performed while inputting moving image data without generating overflow, dropout of data, or the like, and a code stream can be output, not to be included in "great delay".

The encoding device 11 includes a recording-rate control unit 21 configured to control (i.e., input moving image data is compressed) the rate (recording rate) of moving image data at the time of being recorded in a recording medium at the recording unit 12, and an encoding unit 22 configured to compress and encode moving image data.

More specifically, the recording-rate control unit 21 subjects moving image data to addition and subtraction between frames, and the encoding unit 22 includes multiple intra encoders, and subjects each of multiple calculation results obtained at the same timing to intra encoding in parallel.

Thus, the recording-rate control unit 21 enables the flexibility of a frame rate (playback rate) at the time of playing moving image data to be readily and sufficiently obtained, and also can reduce a recording rate, and the encoding unit 22 can encode moving image data of which the frame rate is higher than an ordinary frame rate (high frame rate) in real time using an inexpensive intra encoder having a processing speed capable of encoding an ordinary frame rate in real time.

Accordingly, the encoding device 11 can perform the compression encoding of moving image data having a high frame rate without increase in the capacity of buffer memory and cost (inexpensively and easily), so as to readily and sufficiently obtain the flexibility of a playback rate at the time of playback, without causing a problem such as overflow, the dropout of frames, great delay, and so forth (in real time).

The recording unit 12 writes (records) the code stream supplied from the encoding device 11 in a predetermined recording medium (not shown) which is built therein at a sufficient speed (writing speed faster than the output speed of the encoding device 11). Also, the recording unit 12 reads out a code stream recorded in the recording medium thereof at a sufficient speed as necessary, and supplies this to the decoding device 13. That is to say, the recording unit 12 reads out a code stream at a readout speed sufficient to decode and decompress the code stream on the fly (in real time) without great delay as to a playback speed, and supplies this to the decoding device 13.

The decoding device 13 includes a decoding unit 23 configured to decode and decompress the code stream supplied from the recording unit 12 on the fly (in real time) without great delay as to a playback speed using a method corresponding to the encoding unit 22, and a playback-rate control unit 24 configured to control a frame rate at the time of playback of moving image data.

More specifically, the decoding unit 23, which includes multiple intra decoders, is configured to subject each of multiple intra encoding results encoded in parallel at the encoding unit 22, of a code stream, to intra decoding. The playback-rate control unit 24 decompresses the data subjected to intra decoding at the decoding unit 23, and outputs this at a predetermined playback rate.

Thus, the decoding unit 23 can decode moving image data having a high frame rate in real time using an inexpensive intra decoder having a processing speed capable of decoding an ordinary frame rate in real time, and the playback-rate control unit 24 can readily control playback rate.

Accordingly, the decoding device 13 can perform decoding of a code stream wherein moving image data having a high frame rate is compressed and encoded without increase in the capacity of buffer memory and cost (inexpensively and easily), without causing a problem such as overflow, the dropout of frames, great delay, or the like (in real time), and further, can control the playback rate of the moving image data having a high frame rate thereof.

Description will be made below regarding the details of each unit shown in FIG. 1. Note that hereinafter, description will be made assuming that the frame rate serving as a reference is 60 p (progressive method of 60 frames per second), and a high frame rate is 240 p which is the quadruple thereof (progressive method of 240 frames per second).

Figure 2:
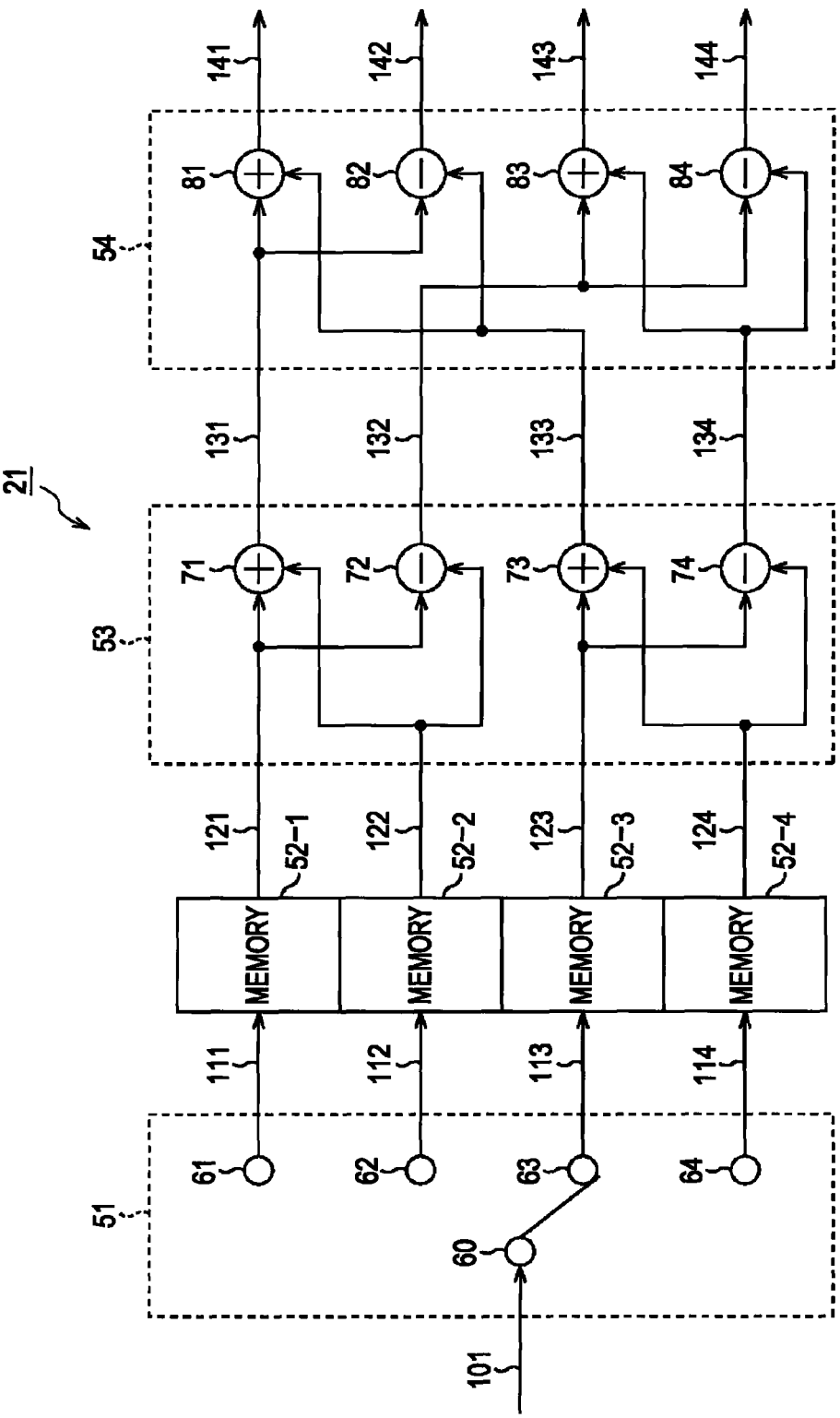
FIG. 2 is a block diagram illustrating a detailed configuration example of the recording-rate control unit in FIG. 1.

FIG. 2 is a block diagram illustrating a detailed configuration example of the recording-rate control unit 21 in FIG. 1. In FIG. 2, the recording-rate control unit 21 includes a distribution unit 51, memory 52-1 through memory 52-4, a first calculating unit 53, and a second calculating unit 54.

The distribution unit 51 is made up of a switching circuit including one input-side terminal 60 and four output-side terminals (output-side terminal 61 through output-side terminal 64). The distribution unit 51, by changing this switch, distributes the data of each frame (frame data) of moving image data 101 having a high frame rate supplied to the input-side terminal 60 to each of the output-side terminal 61 through output-side terminal 64 in order. For example, the distribution unit 51 first connects between the input-side terminal 60 and the output-side terminal 61 to supply the first frame data of the moving image data 101 to the output-side terminal 61, and causes the output-side terminal 61 to output this as frame data 111. Next, the distribution unit 51 changes the switch to connect between the input-side terminal 60 and the output-side terminal 62, supplies the next frame data of the moving image data 101 to the output-side terminal 62, and causes the output-side terminal 62 to output this as frame data 112. Similarly, the distribution unit 51 changes the switch to connect between the input-side terminal 60 and the output-side terminal 63, and causes the output-side terminal 63 to output the next frame data of the moving image data 101 as frame data 113, and further changes the switch to connect between the input-side terminal 60 and the output-side terminal 64, and causes the output-side terminal 64 to output the next frame data of the moving image data 101 as frame data 114. The distribution unit 51 repeats changing of the switch such as shown in above, and causes any one of the output-side terminal 61 through output-side terminal 64 to output each frame data in order.

Note that this changing of the switch (the connection sequence of the output-side terminals) is optional, but hereinafter, for the sake of simplifying description, description will be made regarding a case wherein the connection destination of the input-side terminal 60 is changed repeatedly in order of the output-side terminal 61, output-side terminal 62, output-side terminal 63, output-side terminal 64, output-side terminal 61, output-side terminal 62, and so on. That is to say, frame data temporally becomes old in order of the frame data 111, frame data 112, frame data 113, and frame data 114 (the frame data 111 is the oldest, and the frame data 114 is the newest).

The frame data 111 output from the output-side terminal 61 of the distribution unit 51 is supplied to the memory 52-1, and temporarily held. Similarly, the frame data 112 output from the output-side terminal 62 is supplied to the memory 52-2, the frame data 113 output from the output-side terminal 63 is supplied to the memory 52-3, the frame data 114 output from the output-side terminal 64 is supplied to the memory 52-4, and temporarily held at each memory.

Each of the memory 52-1 through memory 52-4 is buffer memory temporarily holding frame data. Upon frame data being accumulated in all of the memory, each held frame data is output at the same time (frame data 121 through frame data 124). That is to say, with the memory 52-1 through 52-4, the supply timing as to the first calculating unit 53 of one set of frame data (four in the case of FIG. 2) distributed at the distribution unit 51 is arranged to be matched mutually. Now, in the event that there is no need to distinguish each of the memory 52-1 through memory 52-4, this set of memory will be referred to as memory 52.

Each of the frame data 121 through 124 of which the timing is controlled is supplied to the first calculating unit 53. Now, it is needless to say that these of the frame data 121 through frame data 124 are frame data which has not been subjected to addition and subtraction between two pieces of frame data as described later (raw frame data).

The first calculating unit 53 includes an adder 71 and an adder 73 which add between two pieces of raw frame data, and a subtractor 72 and a subtractor 74 which subtract between two pieces of raw frame data, and generates an addition image of a first level, and a subtraction image of a first level. The adder 71 adds, of the frame data 121 through frame data 124, temporally the oldest frame data 121 and the second older frame data 122 (adds between pixel values at the same position within the frames), and outputs the addition result thereof as an addition image 131 of a first level. The subtractor 72 subtracts, of the frame data 121 through frame data 124, temporally the second older frame data 122 from the oldest frame data 121 (subtracts between pixel values at the same position within the frames), and outputs the subtraction result thereof as a subtraction image 132 of a first level. The adder 73 adds, of the frame data 121 through frame data 124, temporally the third older frame data 123 and the newest frame data 124, and outputs the addition result thereof as an addition image 133 of a first level. The subtractor 74 subtracts, of the frame data 121 through frame data 124, temporally the newest frame data 124 from the third older frame data 123, and outputs the subtraction result thereof as a subtraction image 134 of a first level.

That is to say, if we say that the frame data 121 is taken as frame (1), the frame data 122 is taken as frame (2), the frame data 123 is taken as frame (3), the frame data 124 is taken as frame (4), the addition image 131 of the first level is taken as addition (1), the subtraction image 132 of the first level is taken as subtraction (1), the addition image 133 of the first level is taken as addition (2), and the subtraction image 134 of the first level is taken as subtraction (2), the input/output relations of the first calculating unit 53 can be represented with the following Expression (1) through Expression (4).

$$\text{addition}(1) = \text{frame}(1) + \text{frame}(2) \quad (1)$$

$$\text{subtraction}(1) = \text{frame}(1) - \text{frame}(2) \quad (2)$$

$$\text{addition}(2) = \text{frame}(3) + \text{frame}(4) \quad (3)$$

$$\text{subtraction}(2) = \text{frame}(3) - \text{frame}(4) \quad (4)$$

For example, like the above-mentioned Expression (1) and Expression (3), two frames are added, and each added pixel value is divided by two, whereby the mean value of the two frames thereof (changed intermediate value) is calculated. That is to say, the addition image 131 of the first level and the addition image 133 of the first level are made up of the low frequency components of frame data. Thus, an addition image is made up of the total value of two pieces of frame data, so the rate thereof is not changed.

Also, for example, like the above-mentioned Expression (2) and Expression (4), two frames are subtracted, whereby the difference (the rate of change) between the two frames thereof is calculated. That is to say, the subtraction image 132 of the first level and the subtraction image 134 of the first level are made up of the high frequency components of frame data. For example, in the event that the image of frame (1) and the image of frame (2) which are consecutive are identical, the difference thereof becomes zero, so the pixel values (high frequency components) of subtraction (1) all become zero.

With the same moving images, the higher a frame rate is, the smaller the difference between frames is. That is to say, in general, the data amount of a subtraction image is decreased in the case of a high frame rate as compared with the case of an ordinary frame rate, whereby the higher a frame rate is, the more improvement in encoding efficiency can be expected.

Calculations are performed as described above, and the addition image 131 of the first level, the subtraction image 132 of the first level, the addition image 133 of the first level, and the subtraction image 134 of the first level, which were output from the first calculating unit 53, are each supplied to the second calculating unit 54.

The second calculating unit 54 includes an adder 81, a subtractor 82, an adder 83, and a subtractor 84, and adds or subtracts the addition image or subtraction image of the first level, thereby generating an addition image or subtraction image of a second level. The adder 81 adds the addition image 131 of the first level and the addition image 133 of the first level (adds between pixel values at the same position within the frames), and outputs the addition result thereof as an addition image 141 of a second level. The subtractor 82 subtracts the addition image 133 of the first level from the addition image 131 of the first level (subtracts between pixel values at the same position within the frames), and outputs the subtraction result thereof as a subtraction image 142 of a second level. The adder 83 adds the subtraction image 132 of the first level and the subtraction image 134 of the first level, and outputs the addition result thereof as an addition image 143 of a second level. The subtractor 84 subtracts the subtraction image 134 of the first level from the subtraction image 132 of the first level, and outputs the subtraction result thereof as a subtraction image 144 of a second level.

That is to say, if we say that the addition image 141 of the second level is taken as addition (3), the subtraction image 142 of the second level is taken as subtraction (3), the addition image 143 of the second level is taken as addition (4), and the subtraction image 144 of the second level is taken as subtraction (4), the input/output relations of the second calculating unit 54 can be represented with the following Expression (5) through Expression (8).

$$\begin{aligned}\text{addition}(3) &= \text{addition}(1) + \text{addition}(2) \\ &= \{\text{frame}(1) + \text{frame}(2)\} + \\ &\quad \{\text{frame}(3) + \text{frame}(4)\}\end{aligned} \quad (5)$$

$$\begin{aligned}\text{subtraction}(3) &= \text{addition}(1) - \text{addition}(2) \\ &= \{\text{frame}(1) + \text{frame}(2)\} - \\ &\quad \{\text{frame}(3) - \text{frame}(4)\}\end{aligned} \quad (6)$$

$$\text{addition}(4) = \text{subtraction}(1) + \text{subtraction}(2) \quad (7)$$
$$= \{\text{frame}(1) - \text{frame}(2)\} +$$
$$\{\text{frame}(3) - \text{frame}(4)\}$$
$$\text{subtraction}(4) = \text{subtraction}(1) - \text{subtraction}(2) \quad (8)$$
$$= \{\text{frame}(1) - \text{frame}(2)\} -$$
$$\{\text{frame}(3) - \text{frame}(4)\}$$

Thus, while the first calculating unit 53 has performed the addition and subtraction between adjacent two frames, the second calculating unit 54 performs the addition and subtraction among adjacent four frames, so correlation with time ranges (width) longer than the case of the first calculating unit 53 can be taken.

Thus, frame data is subjected to addition and subtraction multiple times, whereby the recording-rate control unit 21 can further improve encoding efficiency. In FIG. 2, description has been made such that the calculations of addition and subtraction are performed once at each of the first calculating unit 53 and the second calculating unit 54 (i.e., twice in total), but the number of times (steps) of addition and subtraction may be any number of times as long as the number of times is greater than once, for example, may be three times or more. Also, while description has been made regarding the case of four frames in FIG. 2, the number of frames to be subjected to addition and subtraction concurrently may be also any number of frames. However, the structure of addition and subtraction of frames needs to be handled at the encoding unit 22, decoding unit 23, and playback-rate control unit 24 (it is necessary to have a variable structure to be set beforehand, or to be handled by sharing information mutually).

In order to decrease the recording rate, it is desirable for the recording-rate control unit 21 to repeatedly perform a subtraction alone, but in order to facilitate playback rate control at the time of playback, it is desirable for the recording-rate control unit 21 to perform not only a subtraction but also an addition so as to obtain a calculation result which facilitates calculations at the time of playback rate control. Such processing of the recording-rate control unit 21 is made up of only a simple addition and subtraction of frame data, so can be readily performed basically without increase in load, but the more the number of operations increases, the more load and processing time increase, and accordingly, it is desirable to determine how to perform an addition and subtraction depending on the trade-off between encoding efficiency and the flexibility of playback rate, and the like.

Note that an addition image and a subtraction image are results of subjecting between two pieces of frame data to addition and subtraction, as described above. That is to say, the recording-rate control unit 21 can transform the frame rate of moving image data into an arbitrary rate by subjecting between two pieces of frame data to addition or subtraction.

The addition image 141 of the second level, subtraction image 142 of the second level, addition image 143 of the second level, and subtraction image 144 of the second level, which were calculated as described above, and output from the second calculating unit 54, are supplied to the encoding unit 22.

Figure 3:
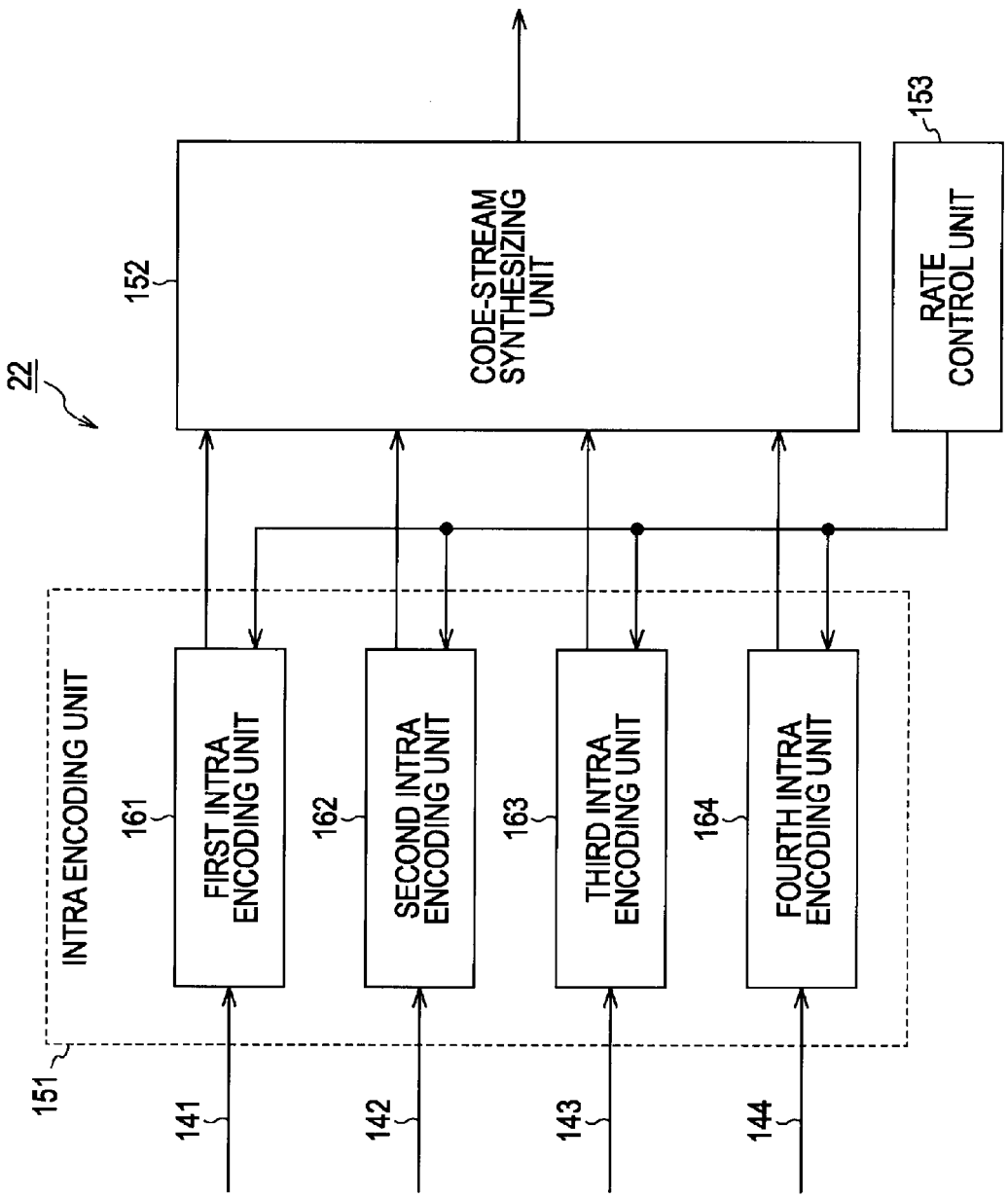
FIG. 3 is a block diagram illustrating a detailed configuration example of the encoding unit in FIG. 1.

Next, description will be made regarding the encoding unit 22 in FIG. 1. FIG. 3 is a block diagram illustrating a detailed configuration example of the encoding unit 22 in FIG. 1. In FIG. 3, the encoding unit 22 includes an intra encoding unit 151 configured to subject input image data to intra encoding, a code-stream synthesizing unit 152 configured to synthesize encoded code streams, and a rate control unit 153 configured to control the encoding bit rate at intra encoding processing.

The intra encoding unit 151 includes a first intra encoding unit 161 through fourth intra encoding unit 164, each of which has encoding capability of 60 p. The first intra encoding unit 161 through fourth intra encoding unit 164 operate mutually concurrently (in parallel), encode the supplied addition image 141 of the second level, subtraction image 142 of the second level, addition image 143 of the second level, and subtraction image 144 of the second level respectively, and supply a code stream to the code-stream synthesizing unit 152. The first intra encoding unit 161 through fourth intra encoding unit 164 are mutually made up of the same encoder, may perform encoding mutually using the same method, or may perform encoding mutually using a different method by making good use of the features of each of the images (addition image 141 of the second level, subtraction image 142 of the second level, addition image 143 of the second level, and subtraction image 144 of the second level) which each of the first intra encoding unit 161 through fourth intra encoding unit 164 processes.

The code-stream synthesizing unit 152 integrates each of the code streams concurrently output from the first intra encoding unit 161 through fourth intra encoding unit 164 in a predetermined order (e.g., output of the first intra encoding unit 161, output of the second intra encoding unit 162, output of the third intra encoding unit 163, and output of the fourth intra encoding unit 164), and outputs this as one code stream.

The rate control unit 153 controls of each of the first intra encoding unit 161 through fourth intra encoding unit 164 to perform determination of an encoding bit rate, quantization control, and so forth. For example, with the data supplied from the recording-rate control unit 21, principally, an addition image made up of the low-frequency components of an image includes many pixel components each of which the value is not zero, and a subtraction image made up of the high-frequency components of an image includes many pixel components each of which the value is zero. Accordingly, it is desirable to assign more code bits to data including many addition images, and conversely to assign few code bits to data including many subtraction images, in respect of improvement in the whole encoding efficiency.

As described above, the encoding unit 22 includes the four intra encoders having encoding capability of 60 p (first intra encoding unit 161 through fourth intra encoding unit 164), and operates these in parallel, whereby moving image data with a high frame rate of 240 p equivalent to the quadruple thereof (actually, addition/subtraction results of four frames) can be encoded. Note that the number of intra encoders of the encoding unit 22 may be any number as long as it corresponds to the number of output of the recording-rate control unit 21. Also, the processing capability necessary for the intra encoder thereof is determined with the frame rate of image data to be processed, the number of intra encoders, and so forth.

Figure 4:
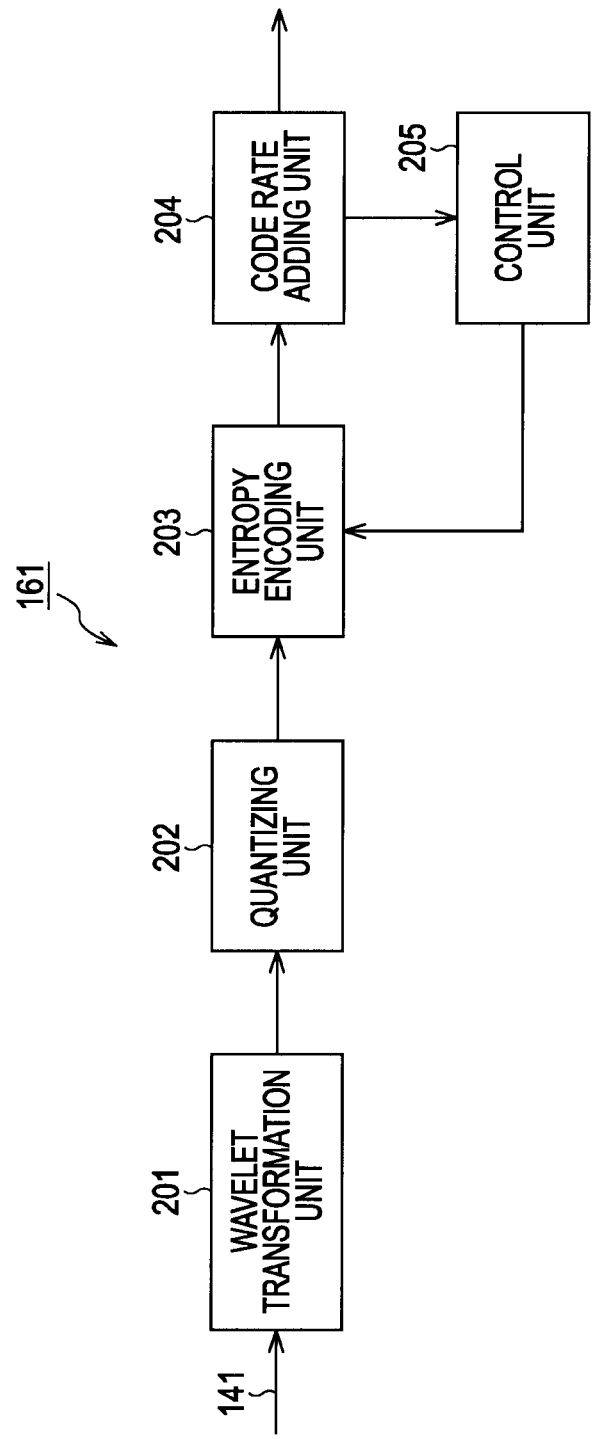
FIG. 4 is a block diagram illustrating a detailed configuration example of the first intra encoding unit in FIG. 3.

Next, description will be made regarding a configuration example of the intra encoders in FIG. 3 (first intra encoding unit 161 through fourth intra encoding unit 164). FIG. 4 is a block diagram illustrating a detailed configuration example of the first intra encoding unit 161. In FIG. 4, the first intra encoding unit 161 includes a wavelet transformation unit 201, a quantizing unit 202, an entropy encoding unit 203, a code-rate adding unit 204, and a control unit 205.

The wavelet transformation unit 201 subjects input data (addition image 141 of the second level) to wavelet transformation (filtering) to generate a wavelet transformation coefficient serving as a predetermined filter factor, and outputs this to the quantizing unit 202. The wavelet transformation unit 201 is usually realized with a filter bank made up of a low-pass filter and a high-pass filter. Note that a digital filter usually has the impulse response (filter factor) of multiple tap lengths, so it is necessary to buffer only the input images or coefficients, which can be filtered, beforehand. Similarly, in the event of performing wavelet transformation in multiple steps as well, it is necessary to buffer only the wavelet transformation coefficients generated at the preceding stage which can be filtered.

Figure 5:
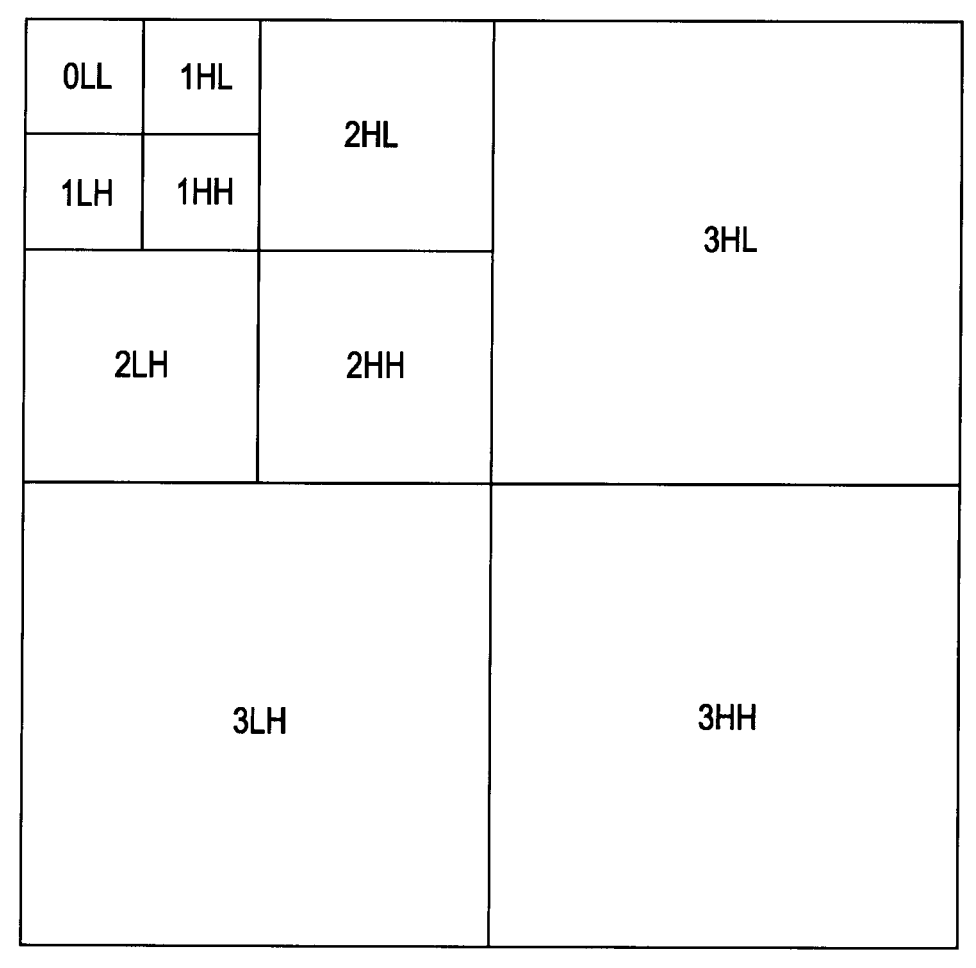

This wavelet transformation is usually repeatedly performed so as to further transform the low-frequency components (sub band) obtained with transformation. FIG. 5 illustrates a configuration example of sub bands obtained in the case of repeating wavelet transformation three times (division level 3). In FIG. 5, L denotes a low-frequency component, and H denotes a high-frequency component. For example, 3LH represents a sub band of which the horizontal direction is a low frequency, and the vertical direction is a high frequency. The sub bands of 3HH, 3LH, 3HL, and 3LL (not shown) are obtained with the first wavelet transformation, the sub bands of 2HH, 2LH, 2HL, and 2LL (not shown) are obtained with the second wavelet transformation, and the sub bands of 1HH, 1LH, 1HL, and 1LL are obtained with the third wavelet transformation.

Figure 6A:
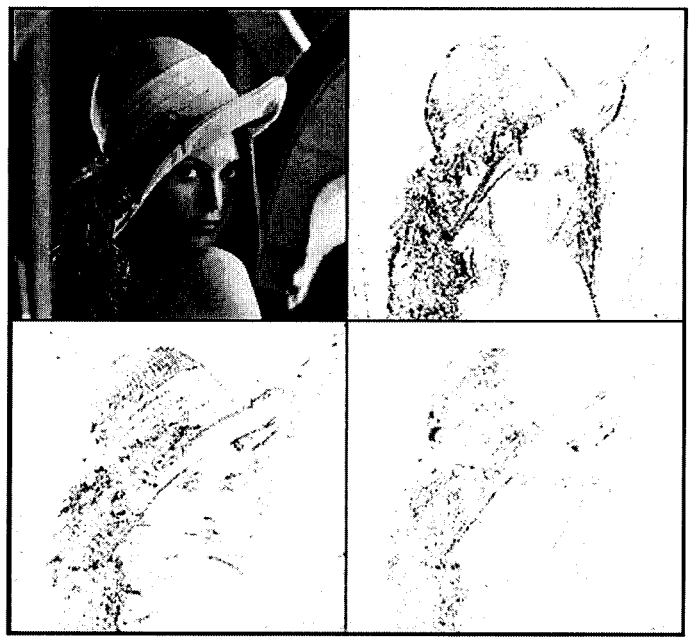
FIG. 6 is a schematic view illustrating an example an energy distribution.
Figure 6B:
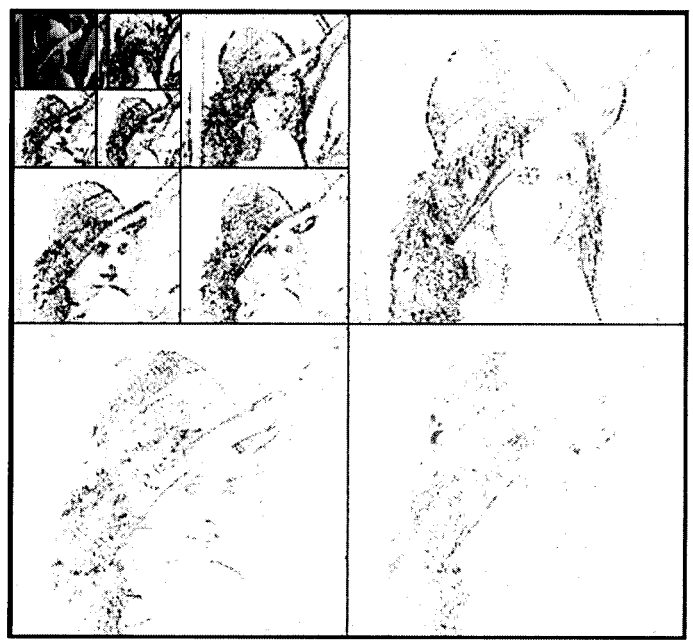

With wavelet transformation, the reason why low frequency components are repeatedly transformed is that most of the energy of an image is concentrated in low frequency components. Examples of a situation of an image subjected to wavelet transformation are shown in FIGS. 6A and 6B. FIG. 6A illustrates an example of respective sub bands obtained with the wavelet transformation of the division level 1, and FIG. 6B illustrates an example of respective sub bands obtained with the wavelet transformation of the division level 3. In either FIG. 6A and FIG. 6B, it can be found that with a low-frequency component, the lower frequency component this is the image is closer to the original image, and the higher frequency component this is the lighter the image is, and has little energy.

The quantizing unit 202 quantizes the wavelet transformation coefficient output from the wavelet transformation unit 201 with scalar quantization or the like employed for JPEG 2000 for example, and outputs the quantized coefficient. In the case of scalar quantization, if we say that a quantized coefficient value to be calculated is q, such as shown in the following Expression (9), the quantized coefficient value q can be obtained by dividing a wavelet transformation coefficient W by a quantization step size $\Delta$.

$$q = W/\Delta \quad (9)$$

The quantizing unit 202 supplies the quantized coefficient thus calculated to the entropy encoding unit 203. The entropy encoding unit 203 is, for example, a unit employed for MPEG and JPEG, which compresses and encodes the supplied quantized coefficient using Huffman encoding wherein a code is generated by referencing a Huffman encoding table created beforehand in accordance with the frequency of appearance, or arithmetic encoding or the like employed for H.264 or JPEG 2000, and outputs the encoding result as a code stream.

As described above, multiple sub bands are formed with the wavelet transformation at the wavelet transformation unit 201, but as described with reference to FIG. 6, from the perspective of the properties of an image, energy gathers mostly at the lowest frequency, and components such as the outline of an image and so forth principally exist in a high frequency. Accordingly, at the time of entropy encoding by the entropy encoding unit 203, for example, encoding is performed in order from the lowest-frequency sub band to the highest-frequency sub band such as shown in arrows in FIG. 7, and many more code rates are assigned to low-frequency components rather than high-frequency components, whereby it can be expected to improve subjective image quality.

Figure 7:
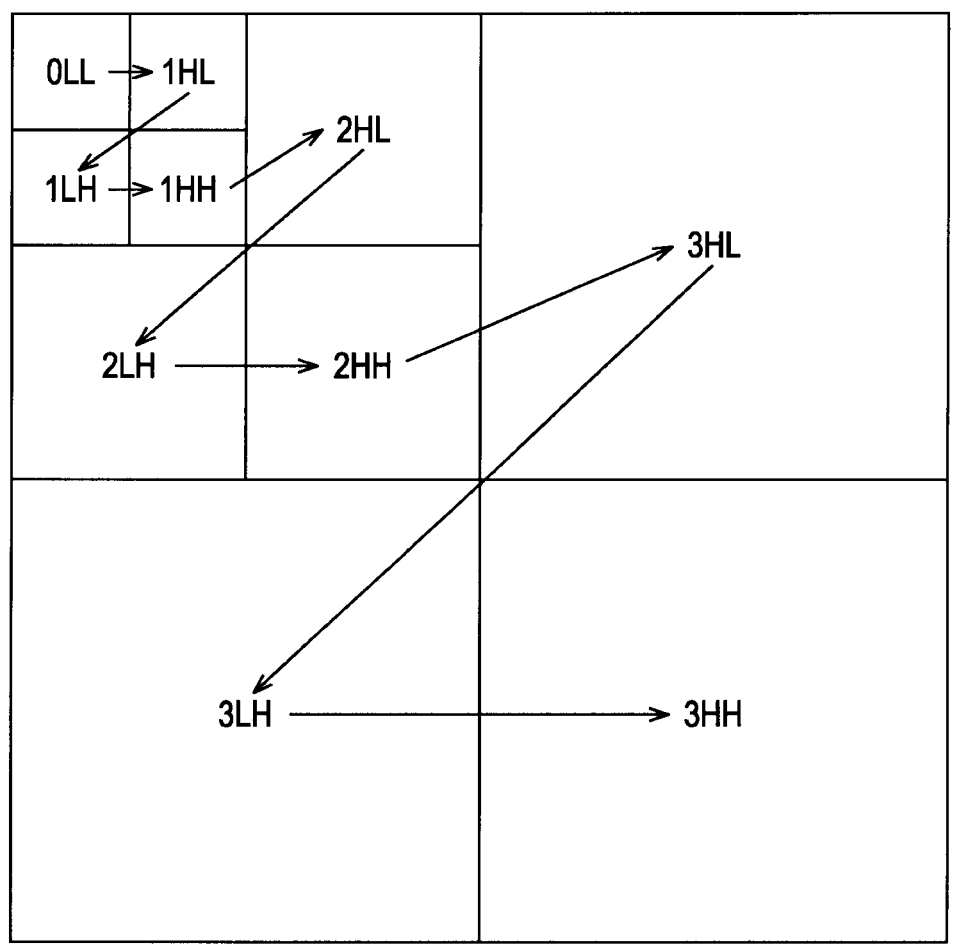
FIG. 7 is a diagram describing an example of the order of encoding.

As for a control method regarding such an encoding order, any method may be employed, but for example, an arrangement may be made wherein the wavelet transformation unit 201 outputs a wavelet coefficient in the order of the arrows in FIG. 7, and each of the quantizing unit 202 and the entropy encoding unit 203 processes the supplied data in order.

Also, an actual moving image is, for example, such as a television signal, usually divided into a brightness signal, and a color difference signal. That is to say, each of the above-mentioned addition image and subtraction image also includes a brightness signal, and a color difference signal. Now, description will be made below, assuming that a brightness signal is taken as Y, the color difference component of a blue color is taken as Cb, and the color difference component of a red color is taken as Cr.

The dynamic range of an addition image is double of that of a subtraction image, but generally, the greater the dynamic range becomes, the greater the encoding bit rate is, accordingly. Thus, if we say that the Y, Cb, and Cr of an addition image are taken as Y (addition), Cb (addition), and Cr (addition) respectively, and the Y, Cb, and Cr of a subtraction image are taken as Y (subtraction), Cb (subtraction), and Cr (subtraction) respectively, the entropy encoding unit 203 can improve encoding efficiency by performing encoding in accordance with the priority order such as shown in the following Expression (10).

$$Y(\text{addition}) > Cb(\text{addition}) > Cr(\text{addition}) > Y(\text{subtraction}) > Cb(\text{subtraction}) > Cr(\text{subtraction}) \quad (10)$$

Note that in Expression (10), ">" represents the comparison between the priorities of the left and right terms thereof, and this case represents that the priority of the left term is higher than the priority of the right term. That is to say, the priority of each term of Expression (10) is higher toward the left, and conversely is lower toward the right.

Also, the brightness components of an image include many more information rates as compared with the color difference components thereof, and also the visual properties of a human as to the brightness components of an image are more sensitive as compared with the visual properties as to the color difference components thereof (i.e., the degradation of a brightness component is more conspicuous to a human's eyes than the degradation of a color difference component), so regarding the encoded data of a brightness component as important contributes to improvement in image quality. Accordingly, the entropy encoding unit 203 may perform encoding based on the priority order such as shown in the following Expression (11).

$$Y(\text{addition}) > Y(\text{subtraction}) > Cb(\text{addition}) > Cb(\text{subtraction}) > Cr(\text{addition}) > Cr(\text{subtraction}) \quad (11)$$

Further, as described with reference to FIG. 7, from the perspective of the properties of an image, energy gathers mostly at the lowest frequency, and components such as the outline of an image and so forth principally exist in a high frequency, so in order to further improve subjectivity image quality, the entropy encoding unit 203 may perform encoding in the order such as shown in arrows in FIG. 8.

In this case, the entropy encoding unit 203 first encodes Y from a low-frequency toward a high-frequency, next encodes Cb from a low-frequency toward a high-frequency, and finally encodes Cr from a low-frequency toward a high-frequency.

The code stream output from the entropy encoding unit 203 is output outside the first intra encoding unit 161 via the code-rate adding unit 204. While the code-rate adding unit 204 counts (accumulates) a code rate within one frame of the code stream output via the unit itself, the code-rate adding unit 204 notifies the control unit 205 of the code rate thereof.

The control unit 205 controls the operation of the entropy encoding unit 203 based on the information of the code rate supplied from the code-rate adding unit 204. Upon the code rate reaching a target value, the control unit 205 outputs a control signal to stop the operation of the entropy encoding unit 203.

Note that the second intra encoding unit 162 through fourth intra encoding unit 164 also have the same configuration as the first intra encoding unit 161, and perform the same processing as the first intra encoding unit 161, so description thereof will be omitted.

Figure 9:
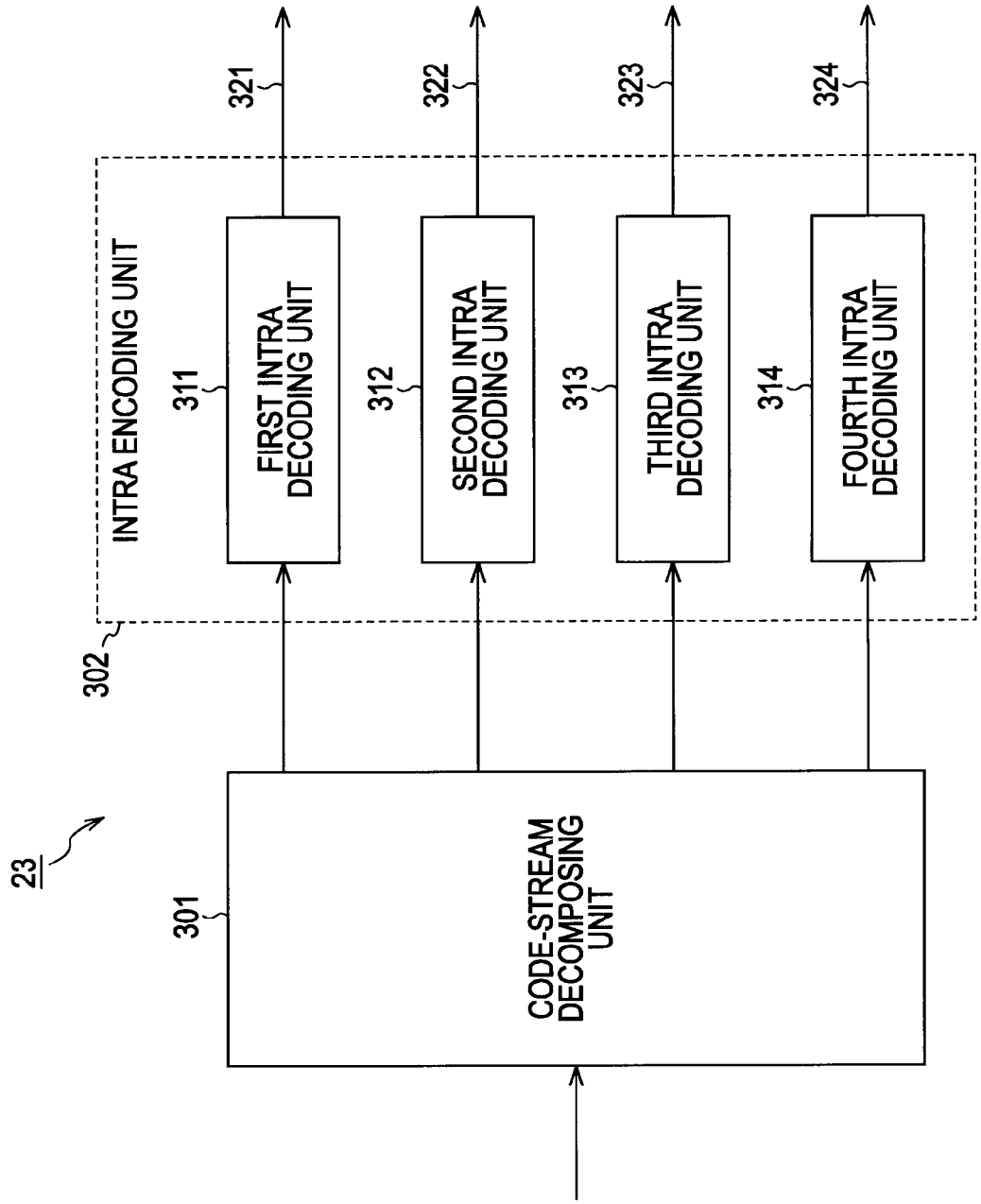
FIG. 9 is a block diagram illustrating a detailed configuration example of the decoding unit in FIG. 1.

Next, description will be made regarding the details of the decoding device 13. FIG. 9 is a block diagram illustrating a detailed configuration example of the decoding unit 23 in FIG. 1. In FIG. 9, the decoding unit 23 includes a code-stream decomposing unit 301, and an intra decoding unit 302.

The decoding device 13 is a device configured to decode the bit stream encoded by the encoding device 11 using a method corresponding to the encoding device 11. That is to say, the code-stream decomposing unit 301 corresponds to the code-stream synthesizing unit 152 in FIG. 3, and the intra decoding unit 302 corresponds to the intra encoding unit 151 in FIG. 3.

That is to say, the code-stream decomposing unit 301 decomposes the code stream which was supplied from the recording unit 12, and integrated into one at the code-stream synthesizing unit 152 so as to return to the state before synthesis by the code-stream synthesizing unit 152. In the case of the example in FIG. 9, the code-stream decomposing unit 301 operates so as to correspond to the example in FIG. 3, decomposes the code stream into the code stream of the addition image 141 of the second level, the code stream of the subtraction image 142 of the second level, the code stream of the addition image 143 of the second level, and the code stream of the subtraction image 144 of the second level, and supplies each of the code streams to the intra decoding unit 302 separately.

The intra decoding unit 302 includes a first intra decoding unit 311 through fourth intra decoding unit 314 so as to correspond to the intra encoding unit 151 in FIG. 3. The first intra decoding unit 311 subjects the code stream of the addition image 141 of the second level supplied from the code-stream decomposing unit 301 to intra decoding using a method corresponding to the intra encoding performed at the first intra encoding unit 161 in FIG. 3, and outputs the addition image 321 of the second level serving as the base band. Similarly, the second intra decoding unit 312 subjects the code stream of the subtraction image 142 of the second level supplied from the code-stream decomposing unit 301 to intra decoding using a method corresponding to the intra encoding performed at the second intra encoding unit 162 in FIG. 3, outputs the subtraction image 322 of the second level serving as the base band, the third intra decoding unit 313 subjects the code stream of the addition image 143 of the second level supplied from the code-stream decomposing unit 301 to intra decoding using a method corresponding to the intra encoding performed at the third intra encoding unit 163 in FIG. 3, outputs the addition image 323 of the second level serving as the base band, and the fourth intra decoding unit 314 subjects the code stream of the subtraction image 144 of the second level supplied from the code-stream decomposing unit 301 to intra decoding using a method corresponding to the intra encoding performed at the fourth intra encoding unit 164 in FIG. 3, and outputs the subtraction image 324 of the second level serving as the base band.

Each of the first intra decoding unit 311 through fourth intra decoding unit 314 needs to correspond to each of the first intra encoding unit 161 through fourth intra encoding unit 164, and may be configured of mutually a different decoder, but hereinafter, description will be made, assuming that those decoding units are configured of mutually the same decoder. That is to say, the description of the configuration of the first intra decoding unit 311, which will be made below, can be applied to the second intra decoding unit 312 through fourth intra decoding unit 314, so that the description regarding the second intra decoding unit 312 through fourth intra decoding unit 314 will be omitted.

Figure 10:
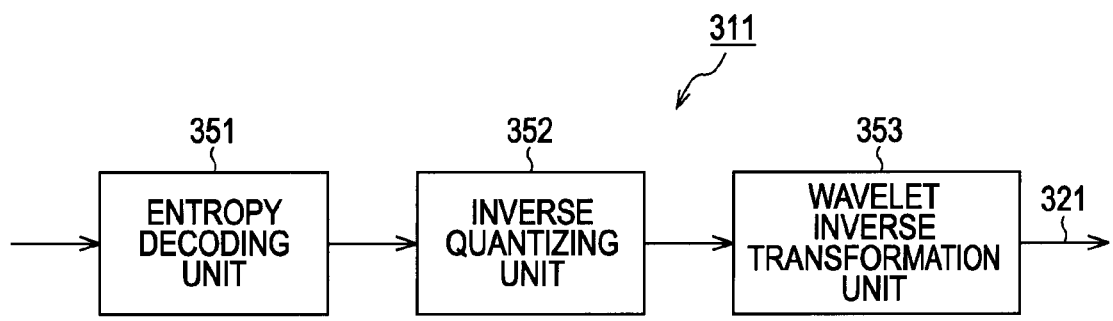
FIG. 10 is a block diagram illustrating a detailed configuration example of the first intra decoding unit in FIG. 9.

FIG. 10 is a block diagram illustrating a detailed configuration example of the first intra decoding unit 311. As shown in FIG. 10, the first intra decoding unit 311 includes an entropy decoding unit 351, an inverse quantizing unit 352, and a wavelet inverse transforming unit 353.

Upon a code stream being input, the entropy decoding unit 351 decodes the code stream thereof using a method corresponding to the entropy encoding by the entropy encoding unit 203 in FIG. 4, and generates a quantized coefficient.

For example, as described above, in the event that the entropy encoding unit 203 in FIG. 4 performs encoding in the order from the lowest-frequency sub band to the highest-frequency sub band, as shown with the arrows in FIG. 7, the entropy decoding unit 351 also performs decoding in the order from the lowest-frequency sub band to the highest-frequency sub band, as shown with the arrows in FIG. 7.

Also, in the event that the entropy encoding unit 203 performs encoding in the priority order such as shown in Expression (10), the entropy decoding unit 351 also performs decoding similarly in the priority order such as shown in Expression (10).

Further, in the event that the entropy encoding unit 203 performs encoding in the priority order such as shown in Expression (11), the entropy decoding unit 351 also performs decoding similarly in the priority order such as shown in Expression (11).

Figure 8:
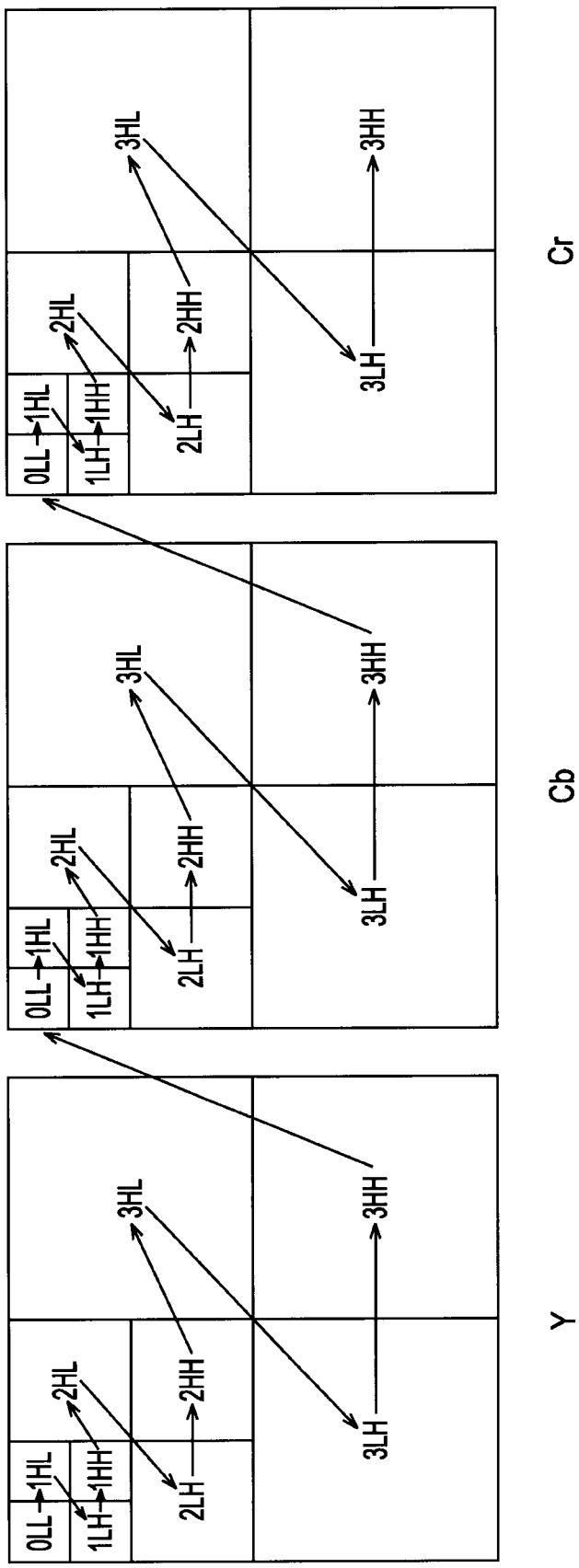
FIG. 8 is a diagram describing another example of the order of encoding.

Further, in the event that the entropy encoding unit 203 performs encoding in the order such as shown in the arrows in FIG. 8, the entropy decoding unit 351 also, such as shown in the arrows in FIG. 8, first decodes Y from a low frequency toward a high frequency, next decodes Cb from a low frequency toward a high frequency, and finally decodes Cr from a low frequency toward a high frequency.

The entropy decoding unit 351 supplies the quantized coefficient obtained by the entropy decoding to the inverse quantizing unit 352.

The inverse quantizing unit 352 performs operation contrary to quantization by the quantizing unit 202 in FIG. 4, and transforms the quantized coefficient into a wavelet transformation coefficient serving as a predetermined filter factor. For example, as described above, in the event that the quantizing unit 202 in FIG. 4 performs quantization by performing the calculation of Expression (9), the inverse quantizing unit 352, such as the following Expression (12), can obtain a wavelet transformation coefficient W by multiplying a quantized coefficient q by a quantization step size $\Delta$.

$$W = q \times \Delta \quad (12)$$

The inverse quantizing unit 352 supplies the wavelet transformation coefficient obtained by the inverse quantization to the wavelet inverse transforming unit 353. The wavelet inverse transforming unit 353 performs wavelet inverse transform (inverse filtering) using a method corresponding to the wavelet transformation by the wavelet transformation unit 201 in FIG. 4, generates the addition image 321 (decoded image) of the second level serving as the base band corresponding to the addition image 141 of the second level from the wavelet transformation coefficient, and outputs this.

The addition image 321 of the second level, the subtraction image 322 of the second level, the addition image 323 of the second level, and the subtraction image 324 of the second level, which are output from the intra decoding unit 302, are supplied to the playback-rate control unit 24 (FIG. 1).

Figure 11:
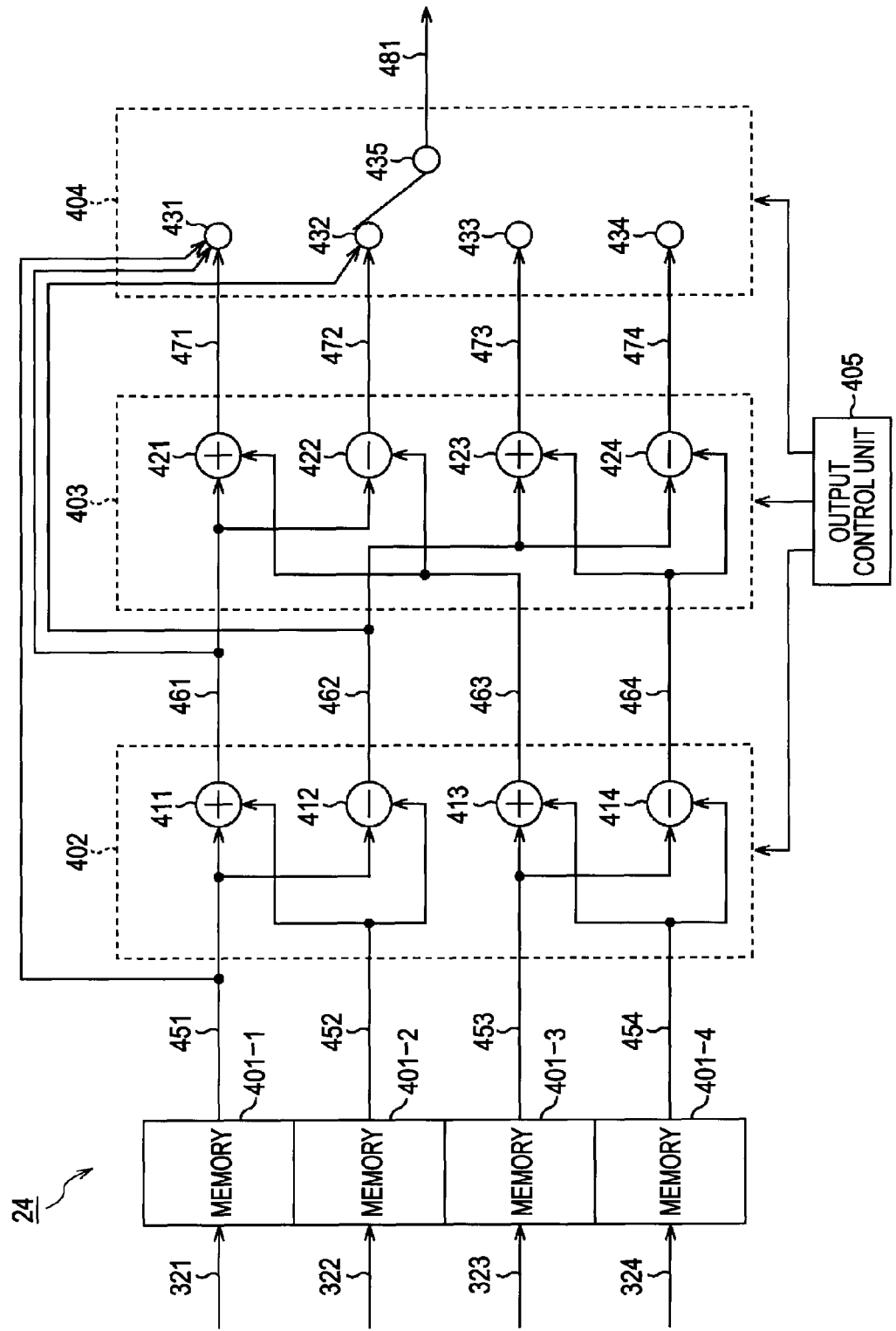
FIG. 11 is a block diagram illustrating a detailed configuration example of the playback-rate control unit in FIG. 1.

FIG. 11 is a block diagram illustrating a detailed configuration example of the playback-rate control unit 24 in FIG. 1. In FIG. 11, the playback-rate control unit 24 includes memory 401-1 through memory 401-4, a first calculating unit 402, a second calculating unit 403, an integrating unit 404, and an output control unit 405.

The addition image 321 of the second level, the subtraction image 322 of the second level, the addition image 323 of the second level, and the subtraction image 324 of the second level, which are output from the intra decoding unit 302, are supplied to the memory 401-1 through memory 401-4 respectively.

Each of the memory 401-1 through memory 401-4 is buffer memory configured to temporarily hold frame data (actually, an addition image or subtraction image of the second level) to align the supply timing as to the first calculating unit 402. Upon frame data being accumulated in all of the memory, the memory 401-1 through memory 401-4 output each held frame data mutually at the same time (an addition image 451 of the second level, a subtraction image 452 of the second level, an addition image 453 of the second level, and a subtraction image 454 of the second level).

Now, in the event that there is no need to make description by distinguishing each of the memory 401-1 through memory 401-4, this set of memory will be referred to as memory 401.

The first calculating unit 402 includes an adder 411 and adder 413 which add frames, and a subtractor 412 and subtractor 414 which subtracts frames. The adder 411 adds the addition image 451 of the second level and the subtraction image 452 of the second level (adds pixel values at the same position within the frames), and outputs the addition result thereof as an addition image 461. The subtractor 412 subtracts the subtraction image 452 of the second level from the addition image 451 of the second level (subtracts pixel values at the same position within the frames), and outputs the subtraction result as a subtraction image 462. The adder 413 adds the addition image 453 of the second level and the subtraction image 454 of the second level, and outputs the addition result thereof as an addition image 463. The subtractor 414 subtracts the subtraction image 454 of the second level from the addition image 453 of the second level, and outputs the subtraction result as a subtraction image 464.

That is to say, the first calculating unit 402 performs multiple calculations at the same time (as the same set) in parallel, and generates multiple calculation results (addition image 461, subtraction image 462, addition image 463, and subtraction image 464) at the same time, and outputs these.

These addition image 461, subtraction image 462, addition image 463, and subtraction image 464, as described below, become an addition image or subtraction image of the first level generated by adding or subtracting two pieces of frame data of moving image data.

That is to say, if we say that the addition image 451 of the second level is taken as addition (3), the subtraction image 452 of the second level is taken as subtraction (3), the addition image 453 of the second level is taken as addition (4), the subtraction image 454 of the second level is taken as subtraction (4), the addition image 461 is taken as addition (5), the subtraction image 462 is taken as subtraction (5), the addition image 463 is taken as addition (6), and the subtraction image 464 is taken as subtraction (6), the input/output relations of the first calculating unit 402 can be represented with the following Expression (13) through Expression (16).

$$\begin{aligned}\text{addition}(5) &= \text{addition}(3) + \text{subtraction}(3) \\ &= \text{addition}(1) + \text{addition}(2) + \text{addition}(1) - \\ &\quad \text{addition}(2) \\ &= 2 \times \text{addition}(1) \\ &= 2 \times \{\text{frame}(1) + \text{frame}(2)\}\end{aligned} \quad (13)$$

$$\begin{aligned}\text{subtraction}(5) &= \text{addition}(3) - \text{subtraction}(3) \\ &= \text{addition}(1) + \text{addition}(2) - \text{addition}(1) + \\ &\quad \text{addition}(2) \\ &= 2 \times \text{addition}(2) \\ &= 2 \times \{\text{frame}(3) + \text{frame}(4)\}\end{aligned} \quad (14)$$

$$\begin{aligned}\text{addition}(6) &= \text{addition}(4) + \text{subtraction}(4) \\ &= \text{subtraction}(1) + \text{subtraction}(2) + \\ &\quad \text{subtraction}(1) - \text{subtraction}(2) \\ &= 2 \times \text{subtraction}(1) \\ &= 2 \times \{\text{frame}(1) - \text{frame}(2)\}\end{aligned} \quad (15)$$

$$\begin{aligned}\text{subtraction}(6) &= \text{addition}(4) - \text{subtraction}(4) \\ &= \text{subtraction}(1) + \text{subtraction}(2) - \\ &\quad \text{subtraction}(1) + \text{subtraction}(2) \\ &= 2 \times \text{subtraction}(2) \\ &= 2 \times \{\text{frame}(3) - \text{frame}(4)\}\end{aligned} \quad (16)$$

Thus, though there is actually a need to divide by two, as for the components of a pixel value, addition (5) is identical to addition (1), subtraction (5) is identical to addition (2), addition (6) is identical to subtraction (1), and subtraction (6) is identical to subtraction (2). That is to say, the addition image 461, subtraction image 462, addition image 463, and subtraction image 464, which are output from the first calculating unit 402, are equivalent to the addition image or subtraction image of the first level. In other words, the first calculating unit 402 can readily generate an addition image or subtraction image of the first level from an addition image and subtraction image of the second level only by performing addition or subtraction.

The addition image 461 of the first level, subtraction image 462 of the first level, addition image 463 of the first level, and subtraction image 464 of the first level thus generated are each supplied to the second calculating unit 403.

The second calculating unit 403 includes an adder 421, a subtractor 422, an adder 423, and a subtractor 424. The adder 421 adds the addition image 461 of the first level and the addition image 463 of the first level, and outputs the addition result thereof as an addition image 471. The subtractor 422 subtracts the addition image 463 of the first level from the addition image 461 of the first level, and outputs the subtraction result thereof as a subtraction image 472. The adder 423 adds the subtraction image 462 of the first level and the subtraction image 464 of the first level, and outputs the addition result thereof as an addition image 473. The subtractor 424 subtracts the addition image 464 of the first level from the subtraction image 462 of the first level, and outputs the subtraction result thereof as a subtraction image 474.

That is to say, the second calculating unit 403 performs multiple calculations at the same time (as the same set) in parallel, and generates multiple calculation results (addition image 471, subtraction image 472, addition image 473, and subtraction image 474) at the same time, and outputs these.

These addition image 471, subtraction image 472, addition image 473, and subtraction image 474, as described below, become the raw frame data of moving image data.

That is to say, if we say that the addition image 471 is taken as addition (7), the subtraction image 472 is taken as subtraction (7), the addition image 473 is taken as addition (8), and the subtraction image 474 is taken as subtraction (8), the input/output relations of the second calculating unit 403 can be represented with the following Expression (17) through Expression (20).

$$\begin{aligned}
\text{addition}(7) &= \text{addition}(5) + \text{addition}(6) \\
&= 2 \times \{\text{addition}(1) + \text{subtraction}(1)\} \\
&= 4 \times \text{frame}(1)
\end{aligned} \quad (17)$$

$$\begin{aligned}
\text{addition}(8) &= \text{subtraction}(5) + \text{subtraction}(6) \\
&= 2 \times \{\text{addition}(2) + \text{subtraction}(2)\} \\
&= 4 \times \text{frame}(3)
\end{aligned} \quad (18)$$

$$\begin{aligned}
\text{addition}(8) &= \text{subtraction}(5) + \text{subtraction}(6) \\
&= 2 \times \{\text{addition}(2) + \text{subtraction}(2)\} \\
&= 4 \times \text{frame}(3)
\end{aligned} \quad (19)$$

$$\begin{aligned}
\text{subtraction}(8) &= \text{subtraction}(5) - \text{subtraction}(6) \\
&= 2 \times \{\text{addition}(2) - \text{subtraction}(2)\} \\
&= 4 \times \text{frame}(4)
\end{aligned} \quad (20)$$

Thus, though there is actually a need to divide by four, as for the components of a pixel value, addition (7) is identical to frame (1), subtraction (7) is identical to frame (2), addition (8) is identical to frame (3), and subtraction (8) is identical to frame (4). That is to say, the addition image 471, subtraction image 472, addition image 473, and subtraction image 474, which are output from the second calculating unit 403, are equivalent to a raw frame image which has been subjected to neither addition nor subtraction. In other words, the second calculating unit 403 can readily generate raw frame data from an addition image and subtraction image of the first level only by performing addition or subtraction.

Note that the division of the above-mentioned pixel values can be performed at an arbitrary process of each calculating unit and thereafter, and description thereof will be omitted.

The addition image 471, subtraction image 472, and addition image 473, and subtraction image 474 thus calculated and output from the second calculating unit 403 (serving as raw frame data) are each supplied to the integrating unit 404.

The integrating unit 404 is made up of a switching circuit including four input-side terminals (input-side terminal 431 through input-side terminal 434) and one output-side terminal 435. The integrating unit 404, by changing this switch, arrays frame data supplied to each of the input-side terminal 431 through input-side terminal 434 (addition image 471, subtraction image 472, addition image 473, and subtraction image 474) in the order of frame number to integrate this, and causes this to be output from the output-side terminal 435 as moving image data 481. For example, the integrating unit 404 connects the input-side terminal 431 through input-side terminal 434 to the output-side terminal 435 in the order from the input-side terminal 431 toward input-side terminal 434, arrays frame data in the order from the addition image 471 toward the subtraction image 474, and integrates this to cause this to be output as moving image data 481. The integrating unit 404 arrays each piece of frame data in a predetermined order to integrate this by repeating changing of the switch such as described above to generate moving image data 481. This order may be any order as long as it corresponds to the order distributed at the distributing unit 51 of the recording-rate control unit 21 in FIG. 2, may be determined beforehand, or may be determined in conjunction with the distributing unit 51.

Note that the first calculating unit 402, second calculating unit 403, and integrating unit 404 operate under the control of the output control unit 405. The output control unit 405 controls the operation of each unit of the first calculating unit 402, second calculating unit 403, and integrating unit 404 so as to output the moving image data 481 at a specified frame rate (playback rate).

Also, the playback-rate control unit 24 is configured so as to supply the addition image 451 of the second level output from the memory 401-1 to (the input-side terminal 431 of) the integrating unit 404, so as to supply the addition image 461 of the first level output from the adder 411 of the first calculating unit 402 to (the input-side terminal 431 of) the integrating unit 404, and further so as to supply the subtraction image 462 of the first level output from the subtractor 412 of the first calculating unit 402 to (the input-side terminal 432 of) the integrating unit 404.

That is to say, for example, the output control unit 405 can control the first calculating unit 402 and second calculating unit 403 to stop the operation thereof, control the addition image 451 of the second level to be supplied to the input-side terminal 431 of the integrating unit 404, control the input-side terminal 431 and output-side terminal 435 to be connected to the integrating unit 404 fixedly, and also can control the addition image 451 to be output as moving image data 481. In this case, only the addition image 451 of the second level is supplied to the integrating unit 404, and neither the addition image 471, subtraction image 472, addition image 473, nor the subtraction image 474 are supplied to the integrating unit 404.

Also, for example, the output control unit 405 can control the second calculating unit 403 to stop the operation thereof, control the addition image 461 of the first level to be supplied to the input-side terminal 431 of the integrating unit 404, control the subtraction image 462 of the first level to be supplied to the input-side terminal 432 of the integrating unit 404, control the connection between the input-side terminal 431 and the output-side terminal 435, and the connection between the input-side terminal 432 and the output-side terminal 435 to be changed to integrate the addition image 461 and the subtraction image 462, and to output this as moving image data 481. In this case, only the addition image 461 of the first level and the subtraction image 462 of the first level are supplied to the integrating unit 404, and neither the addition image 471, subtraction image 472, addition image 473, subtraction image 474, nor the addition image 451 of the second level are supplied to the integrating unit 404.

That is to say, with the playback-rate control unit 24, the first calculating unit 402 and second calculating unit 403 perform addition and subtraction using a supplied addition image and supplied subtraction image to generate frame data of an arbitrary frame rate, based on the control of the output control unit 405. The integrating unit 404 integrates the generated frame data in the order of frame number to output this as moving image data 481 based on the control of the output control unit 405.

Note that as described above, an addition image and a subtraction image are obtained by adding and subtracting between two pieces of frame data, so these are also frame data (data in increments of frame). That is to say, the playback-rate control unit 24 can transform the frame rate of moving image data into an arbitrary rate by adding or subtracting between two pieces of frame data. Thus, the output control unit 405 can control the frame rate of the moving image data to be output, i.e., the frame rate (playback rate) at the time of playback by controlling each unit.

Note that with the above description, the number of data to be processed by each unit of the memory 401, first calculating unit 402, second calculating unit 403, and integrating unit 404 may be any number, but actually, it is necessary for the number thereof to correspond to the input/output of the decoding unit 23, decoding device 11, and so forth.

Also, with the first calculating unit 402 and second calculating unit 403, for example, it is optional which data is added to which data, and which data is subtracted from which data. Further, it is also optional how many frames of data are added or subtracted as one set. Also, it is optional how many times addition and subtraction such as described above are performed (how many calculating units are provided).

For example, if we say that M and N are taken as arbitrary natural numbers (M≤N), an arrangement may be made wherein N calculating units are mutually serially connected, the calculating unit of the first stage subjects moving image data to be input from the outside of the playback-rate control unit 24 to addition and subtraction, the calculating units of the second stage and thereafter subject the addition image and subtraction image (the calculation result of the previous stage) to be output from the calculating unit of the previous stage to addition and subtraction, and further, the output control unit 405 operates M calculating units from the first stage to the M'th stage so as to perform addition and subtraction necessary times for obtaining a desired playback rate, and outputs the output of the calculating unit of the M'th stage to the outside of the playback-rate control unit 24 via the integrating unit 404.

At this time, moving image data to be input to the playback-rate control unit 24 may be configured of raw frame data which has not been subjected to addition and subtraction between two pieces of frame data, or for example, as described above, may be configured of at least any one of an addition image added between two pieces of frame data, and a subtraction image subtracted between two pieces of frame data.

For example, in the event that N calculating units are mutually serially connected as described above, an arrangement may be made wherein moving image data of which the frame rate is reduced with addition or subtraction is input to the playback-rate control unit 24, and the frame rate of the moving image data to be obtained becomes double thereof each time addition and subtraction are performed at each calculating unit of the playback-rate control unit 24. For example, if we say that K is an arbitrary natural number, an arrangement may be made wherein the frame rate of moving image data to be output by the calculating unit of the K'th stage from the final stage is arranged to become 1/2000 of the frame rate of the original moving image data which has been subjected to neither addition nor subtraction, and K=0, i.e., upon the output control unit 405 operating all of the calculating units, the frame rate of moving image data to be output from the playback-rate control unit 24 becomes the frame rate of the original moving image data. According to such an arrangement, the output control unit 405 can control each unit so as to readily obtain the moving image data of a target frame rate.

Consequently, the playback-rate control unit 24 needs to include multiple calculating units configured to transform a frame rate by adding and subtracting between two pieces of frame data, and further, an output control unit configured to subject each piece of frame data of moving image data to at least any one of addition and subtraction between two pieces of frame data necessary times for transforming the frame rate of the moving image data into a desired rate. However, it is necessary for such a rate transforming method to correspond to the encoding device 11 and the decoding unit 23.

Next, description will be made regarding a specific example of frame control performed at the playback-rate control unit 24.

FIG. 12 is a schematic view illustrating a comparative example of each frame rate. In FIG. 11, upon the output control unit 405 operating all of the first calculating unit 402, second calculating unit 403, and integrating unit 404, and restoring all of the frame images to integrate these, as shown in the top row in FIG. 12, the addition image 471, subtraction image 472, addition image 473, and subtraction image 474 of 60 frames per second are integrated, so the frame rate of the moving image data 481 to be output becomes 60×4, i.e., 240 frames per second.

Upon this moving image data of 240 frames per second being played and displayed at not 240 p but 60 p, ¼ slow motion playback can be realized. In the event of such slow motion playback, repetition of a frame image which is commonly performed is not performed, whereby very smooth slow motion can be realized. Such a function is often implemented in, for example, expensive camcorders and film cameras for movies. Particularly, in the event of viewing a high-speed subject image slowly, slow motion playback is indispensable.

Also, in FIG. 11, upon the output control unit 405 causing the second calculating unit 403 to stop its own operation, and integrating and outputting the addition image 461 of the first level and the subtraction image 462 of the first level, such as shown in the second row from the top of FIG. 12, 2×{frame (1)+frame (2)} and 2×{frame (3)+frame (4)} are integrated and output. That is to say, the frame rate of the moving image data 481 becomes 60×2, i.e., 120 frames per second. Also, upon this moving image data of 120 frames per second being played and displayed with not 120 p but 60 p, ½ slow motion playback can be realized.

Further, in FIG. 11, upon the output control unit 405 causing the first calculating unit 402 and second calculating unit 403 to stop their own operation, controlling the output of the memory 401-1 to be supplied to the input-side terminal 431 of the integrating unit 404, controlling the input-side terminal 431 thereof to be fixedly connected to the output-side terminal 435 to output the addition image 451 of the second level, such as shown in the third row from the top of FIG. 12, 4×frame (1) is output. That is to say, the frame rate of the moving image data 481 becomes 60×1, i.e., 60 frames per second. Also, upon this moving image data of 60 frames per second being displayed at 60 p, ordinary playback as usual is realized. Thus, the playback-rate control unit 24 can control the frame rate of the moving image data 481 to be readily output, i.e., the playback rate.

Note that the decoding capability (decompression decoding speed) necessary for the decoding unit 23 differs depending on the frame rate at the time of playback. With the above-mentioned example, description has been made wherein the intra decoding unit 302 of the decoding unit 23 includes the four intra decoders (first intra decoding unit 311 through fourth intra decoding unit 314), and decodes a code stream using all of these, but actually, in the event that the frame rate (playback rate) at the time of playback is low, the necessary decoding capability (decompression decoding speed) is decreased. Accordingly, the intra decoding unit 302 may operate only the necessary intra decoder, and stop the operation of the unnecessary intra decoders. Thus, the decoding unit 23 can reduce the power consumption thereof.

Figure 13:
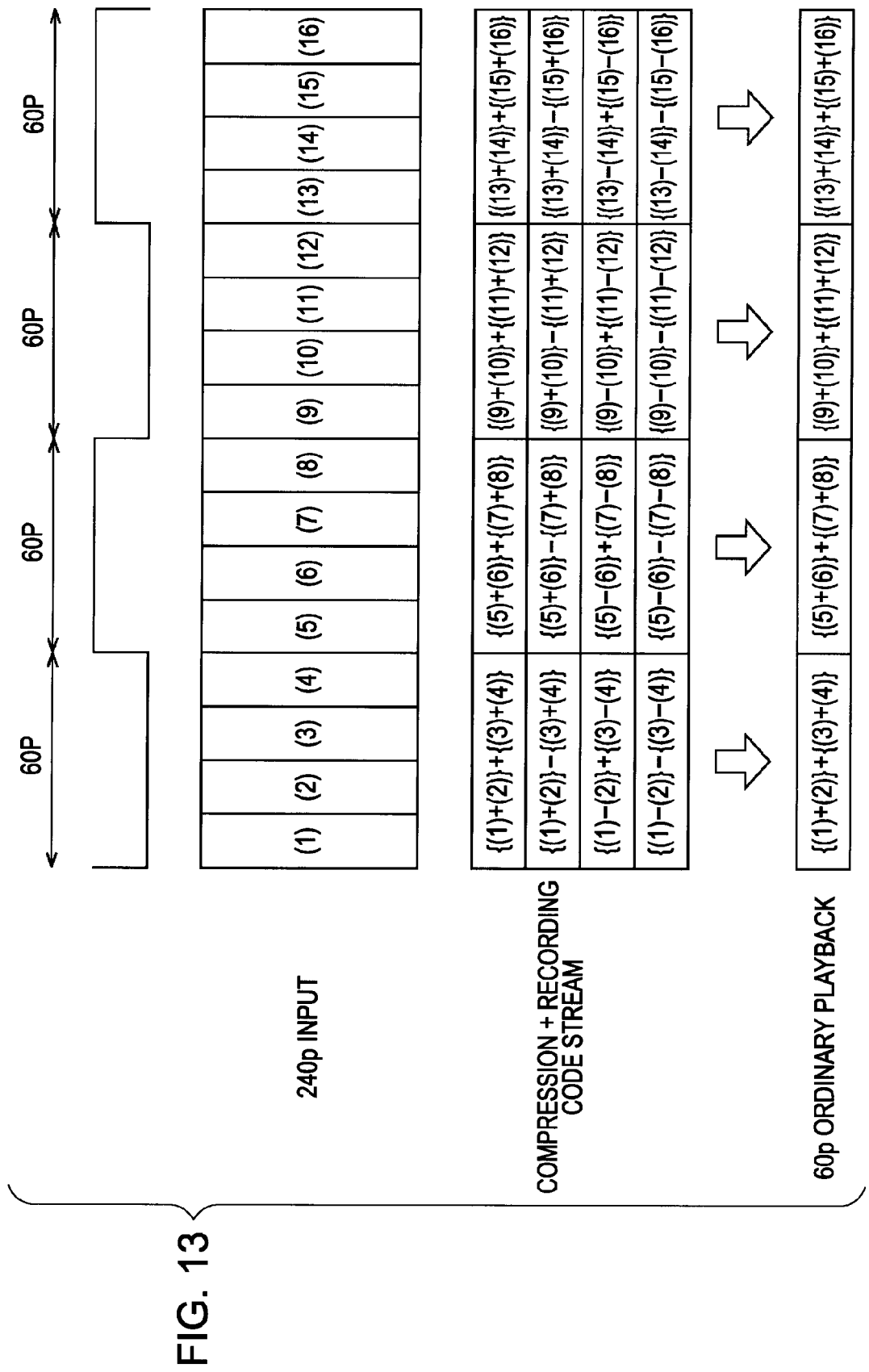
FIG. 13 is a diagram describing an example of a decoding method in accordance with a playback rate.

For example, as shown in FIG. 13, upon moving image data of 240 p being input, the encoding device 11 performs compression encoding using the four encoders, generates four code streams (compression+recording code streams), and records these in the recording unit 12 (actually, these four code streams are synthesized into one, and recorded, but the data structure thereof is substantially equivalent to the four code streams before synthesizing).

In the event that this code stream is decompressed and decoded, subjected to ordinary playback (1× playback) at 60 p, and the image thereof is displayed on a monitor, the decoding unit 23 needs to decompress and decode only the second code stream from the top of the four code streams in FIG. 13 (compression+recording code streams) with decoding capability of 60 p (decompression decoding speed), and the playback-rate control unit 24 needs to output the addition image 451 of the second level as moving image data 481. In this case, the moving image data 481 is made up of the frame of 60 p wherein the four frames of 240 p are added, so the moving image data 481 is subjected to ordinary playback by being played at 60 p.

That is to say, the intra decoding unit 302 of the decoding unit 23 can operate only the first intra decoding unit 311 having decoding capability of 60 p, and stop the operation of the second intra decoding unit 312 through fourth intra decoding unit 314. Thus, the power consumption of the decoding unit 23 can be reduced.

Figure 14:
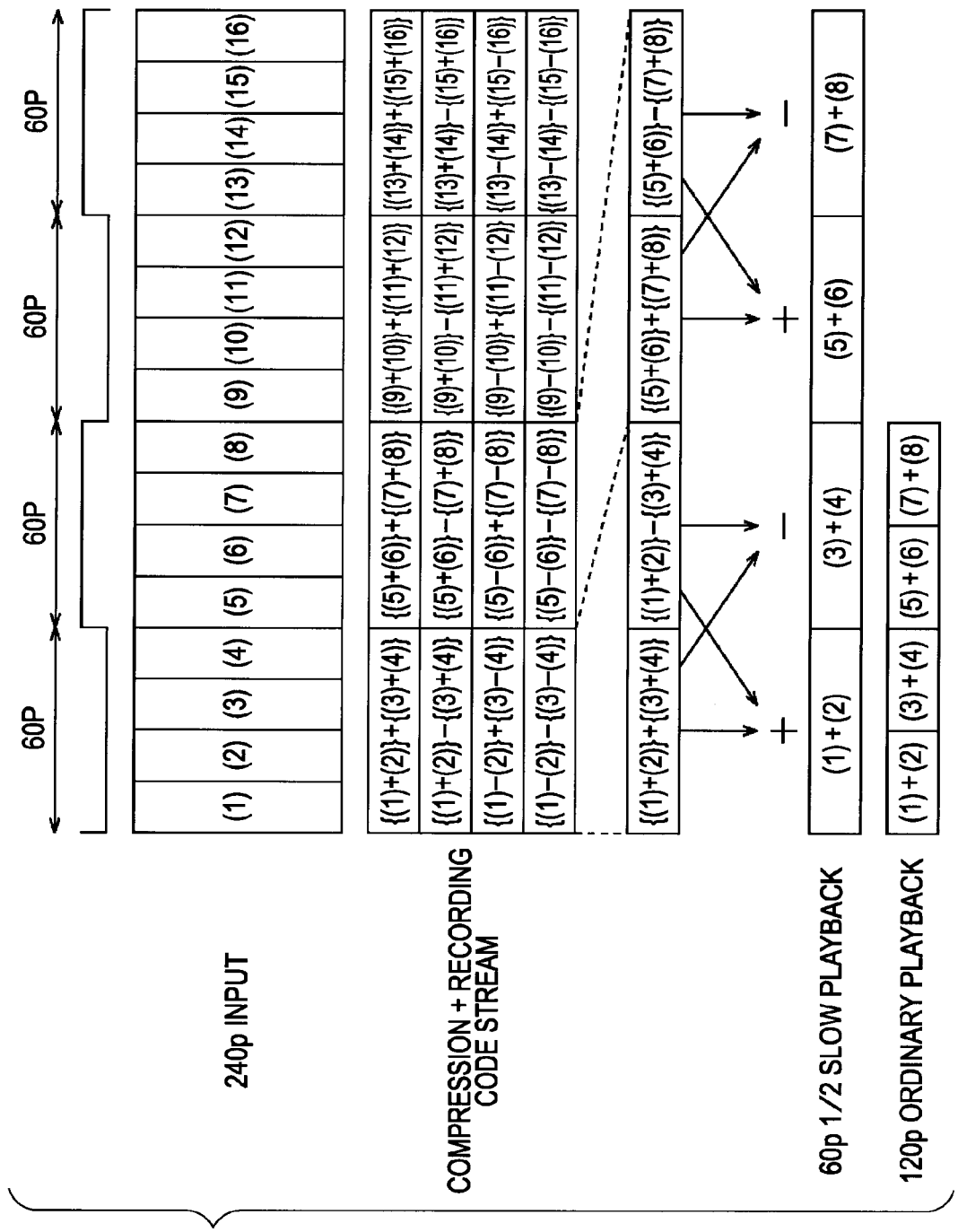
FIG. 14 is a diagram describing another example of a decoding method in accordance with a playback rate.

Also, in the event that this code stream is decompressed and decoded, and subjected to ½ slow playback (½×playback) at 60 p, and the image thereof is displayed on a monitor, as shown in FIG. 14, the decoding unit 23 needs to alternately decompress and decode the two first and second code streams from the top of the four compression+recording streams, and the playback-rate control unit 24 needs to alternately output the addition image 461 of the first level and the subtraction image 462 of the first level as the moving image data 481, which were added or subtracted and obtained using the first calculating unit 402. In this case, the moving image data 481 is made up of the frame of 120 p wherein the two frames of 240 p are added, but is subjected to ½ slow playback by being played at 60 p. In this case also, the playback rate is 60 p, so the decoding capability of the decoding unit 23 may be 60 p.

That is to say, the intra decoding unit 302 of the decoding unit 23 can operate only the first intra decoding unit 311 having decoding capability of 60 p, and stop the operation of the second intra decoding unit 312 through fourth intra decoding unit 314. However, in this case, the first intra decoding unit 311 needs to alternately decode the two first and second compression+recording code streams from the top of FIG. 14.

Note that in the event that the moving image data 481 of this case is subjected to ordinary playback at 120 p, the encoding capability necessary for the decoding unit 23 becomes 120 p, so the intra decoding unit 302 of the decoding unit 23 needs to operate the first intra decoding unit 311 and second intra decoding unit 312 having decoding capability of 60 p.

Figure 15:
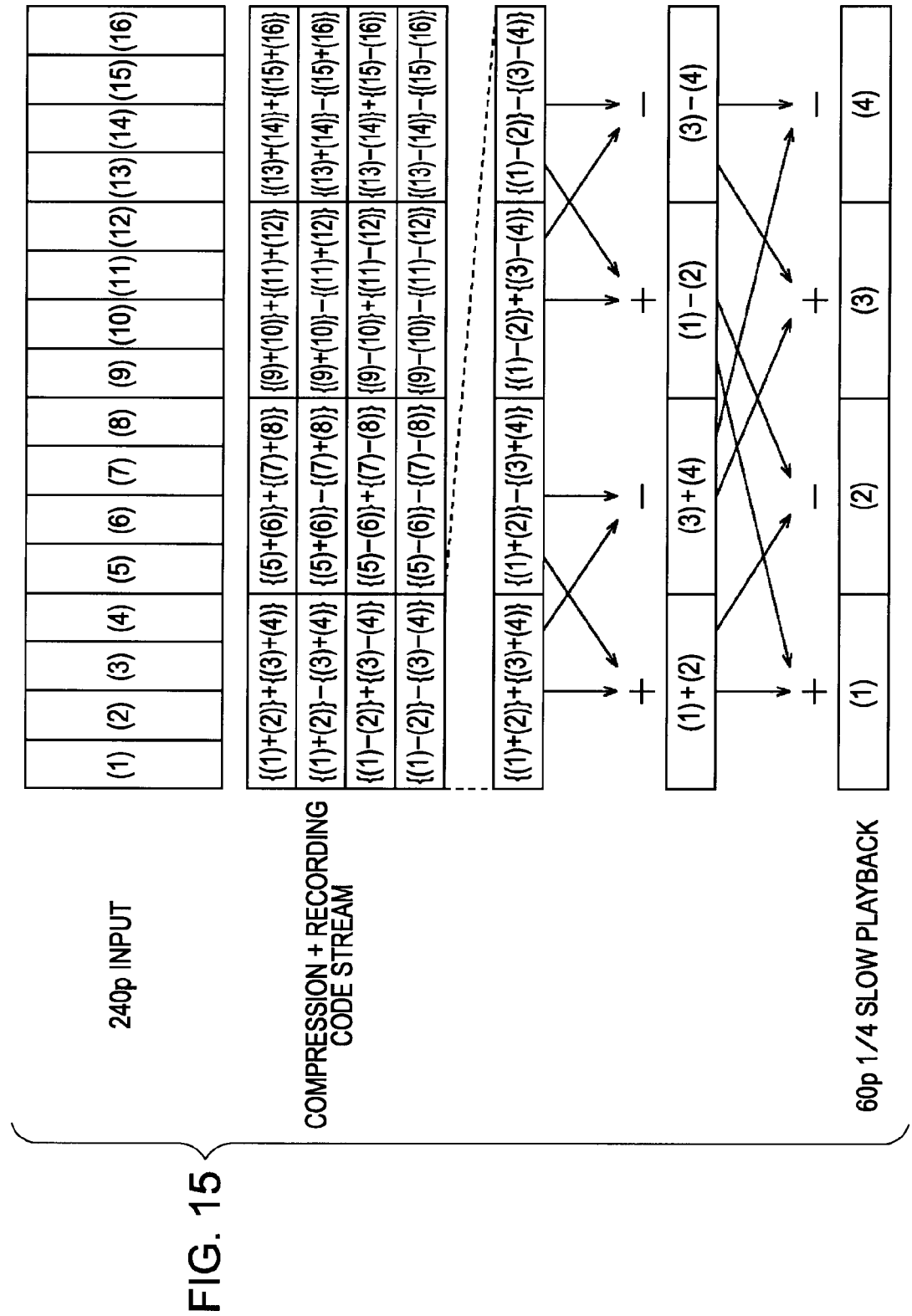
FIG. 15 is a diagram describing yet another example of a decoding method in accordance with a playback rate.
Figure 16:
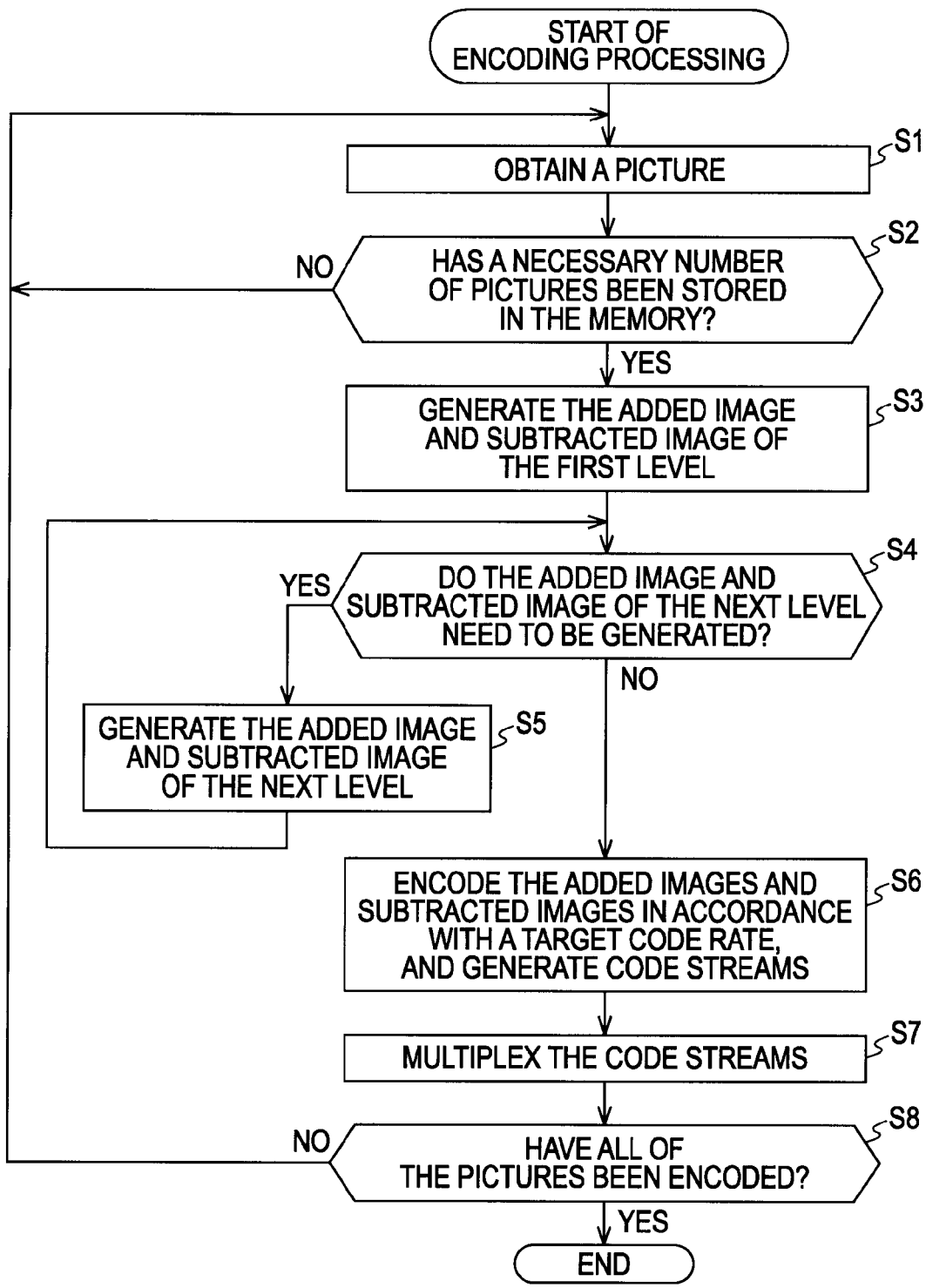
FIG. 16 is a flowchart describing an example of the flow of encoding processing.
Figure 17:
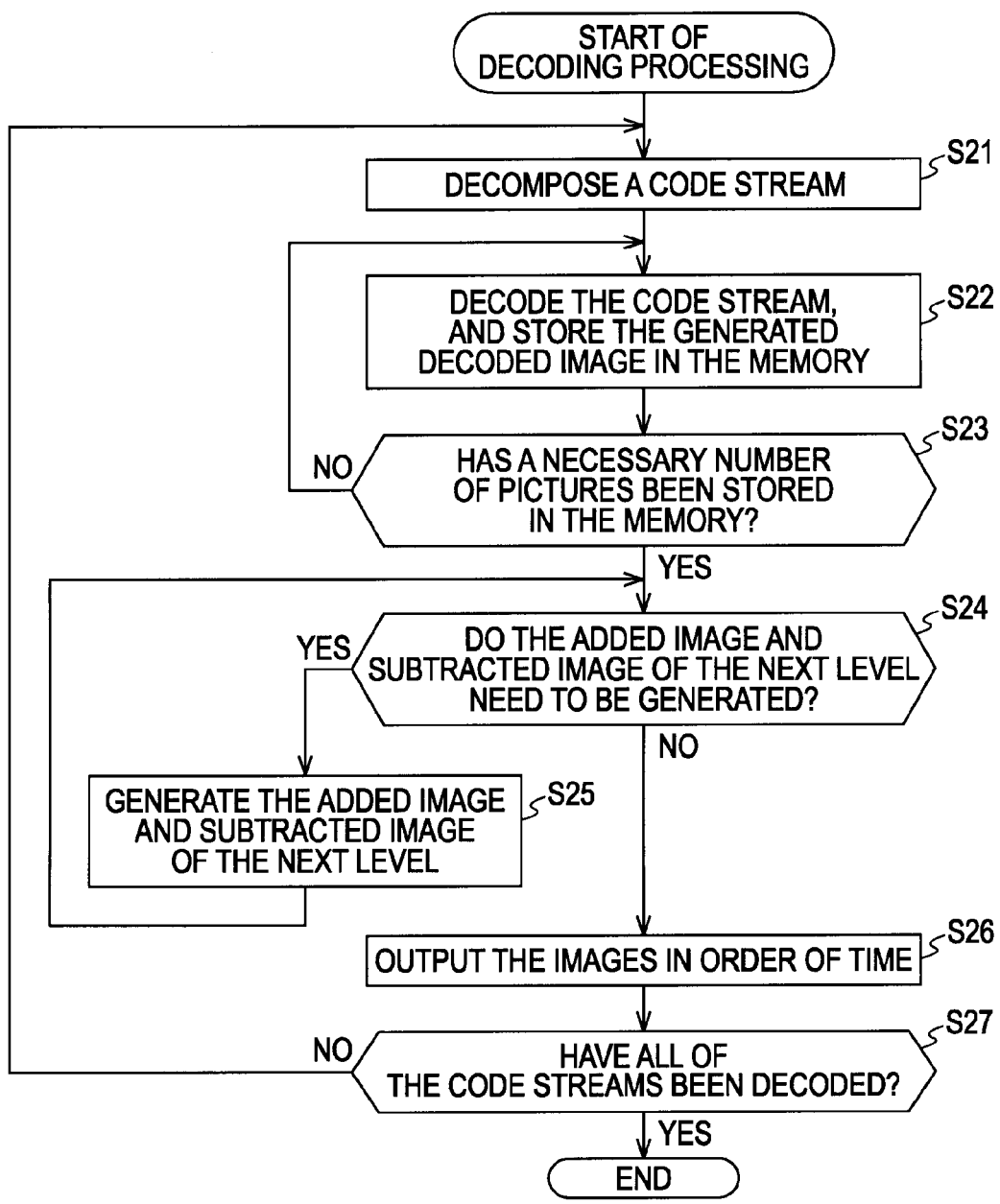
FIG. 17 is a flowchart describing an example of the flow of decoding processing.

Further, in the event that this code stream is decompressed and decoded, and subjected to ¼ slow playback (¼×playback) at 60 p, and the image thereof is displayed on a monitor, the decoding unit 23 needs to decompress and decode the four compression+recording streams in the order from the top as shown in FIG. 15, and the playback-rate control unit 24 needs to array and integrate the frame data in order using the integrating unit 404, which was added or subtracted and obtained using the first calculating unit 402 and second calculating unit 403, and is output as the moving image data 481. In this case, the moving image data 481 is made up of the frame of 240 p, but is subjected to ¼ slow playback by being played at 60 p.

In this case also, the playback rate is 60 p, so the decoding capability of the decoding unit 23 may be 60 p. That is to say, the intra decoding unit 302 of the decoding unit 23 can operate only the first intra decoding unit 311 having decoding capability of 60 p, and stop the operation of the second intra decoding unit 312 through fourth intra decoding unit 314. However, in this case, first intra decoding unit 311 needs to decode the four compression+recording code streams in order from the top, as shown in FIG. 15.

As described above, the number of intra decoders to be operated is reduced in accordance with the playback rate, whereby the decoding device 13 can reduce the power consumption of the decoding unit 23. Also, the playback-rate control unit 24 can readily perform the variable playback of a moving image of a high frame rate.

Next, description will be made regarding an example of the flow of processing to be executed by the encoding device 11 and decoding device 13 as described above. First, description will be made regarding an example of the flow of the encoding processing to be executed by the encoding device 11.

The recording-rate control unit 21 of the encoding device 11 obtains a picture in step S1, and stores this in the memory 52. In step S2, the recording-rate control unit 21 determines whether or not the data of necessary number of pictures is stored in the memory 52, and repeats the processing in step S1 and step S2 until determination is made that the data of the necessary number of pictures is stored. In the event that determination is made in step S2 that the data of the necessary number of pictures is stored, in step S3 the first calculating unit 53 generates an addition image and subtraction image of the first level using the frame data accumulated in the memory 52.

In step S4, the recording-rate control unit 21 determines whether or not an addition image and subtraction image of the next level are generated, and in the event of determining to generate those images, the processing is advanced to step S5. In this case, "the next level" represents the level incremented by one from the current level. In step S5, the next calculating unit (the second calculating unit 54 in the case of immediately after the processing in step S3) generates an addition image and subtraction image of the next level (the second level in the case of immediately after the processing in step S3), and then the processing is returned to step S4. That is to say, the processing in step S4 and step S5 is repeated by the number of calculating units (until the level specified beforehand). In the event that an addition image and subtraction image of a desired level is obtained in step S4, and determination is made that an addition image and subtraction image of the next level are not generated, the recording-rate control unit 21 advances the processing to step S6.

In step S6, the intra encoding unit 151 of the encoding unit 22 generates a code stream by encoding the obtained addition image and subtraction image in accordance with a target code rate. In step S7, the code-stream synthesizing unit 152 multiplexes and outputs the code streams obtained with encoding.

In step S8, the encoding device 11 determines whether or not all of the pictures (or frames) have been encoded, and in the event that determination is made that there is an unprocessed picture (or frame), the processing is returned to step S1, where the processing thereafter is repeated. Also, in the event that determination is made in step S8 that all of the pictures (or frames) have been encoded, the encoding device 11 ends the encoding processing.

Next, description will be made regarding the flow of the decoding processing to be executed by the decoding device 13.

In step S21, the code-stream decomposing unit 301 of the decoding unit 23 of the decoding device 13 decomposes the obtained code stream. In step S22, the intra decoding unit 302 decodes a code stream, and stores the generated decoded image in the memory of the playback-rate control unit 24.

In step S23, the playback-rate control unit 24 determines whether or not the data of the necessary number of pictures has been stored in the memory 401, and repeats the processing in step S22 and step S23 until determination is made that the data of the necessary number of pictures has been stored in the memory 401. In the event that determination is made in step S23 that the data of the necessary number of pictures has been stored in the memory 401, in step S24 the output control unit 405 determines whether or not an addition image and subtraction image of the next level are generated, and in the event of determining to generate the images, the processing is advanced to step S25. In this case, "the next level" represents the level incremented by one from the current level. In step S25, the next calculating unit (the first calculating unit 402 in the case of immediately after the processing in step S23) generates an addition image and subtraction image of the next level (the first level in the case of immediately after the an addition image and subtraction image of the second level are stored in the memory 401 in step S23), and then the processing is returned to step S24. That is to say, the processing in step S24 and step S25 is repeated by the number of calculating units to be operated by the output control unit 405 (until the level specified beforehand). In the event that an addition image and subtraction image of a desired level is obtained in step S24, and determination is made that an addition image and subtraction image of the next level are not generated, the output control unit 405 advances the processing to step S26.

In step S26, the integrating unit 404 outputs images in order of time under the control of the output control unit 405. In step S27, the decoding device 13 determines whether or not all of the codes streams have been decoded, and in the event that determination is made that there is an unprocessed code stream, the processing is returned to step S21, where the processing thereafter is repeated. Also, in the event that determination is made in step S27 that all of the code streams have been decoded, the decoding device 13 ends the decoding processing.

Figure 18:
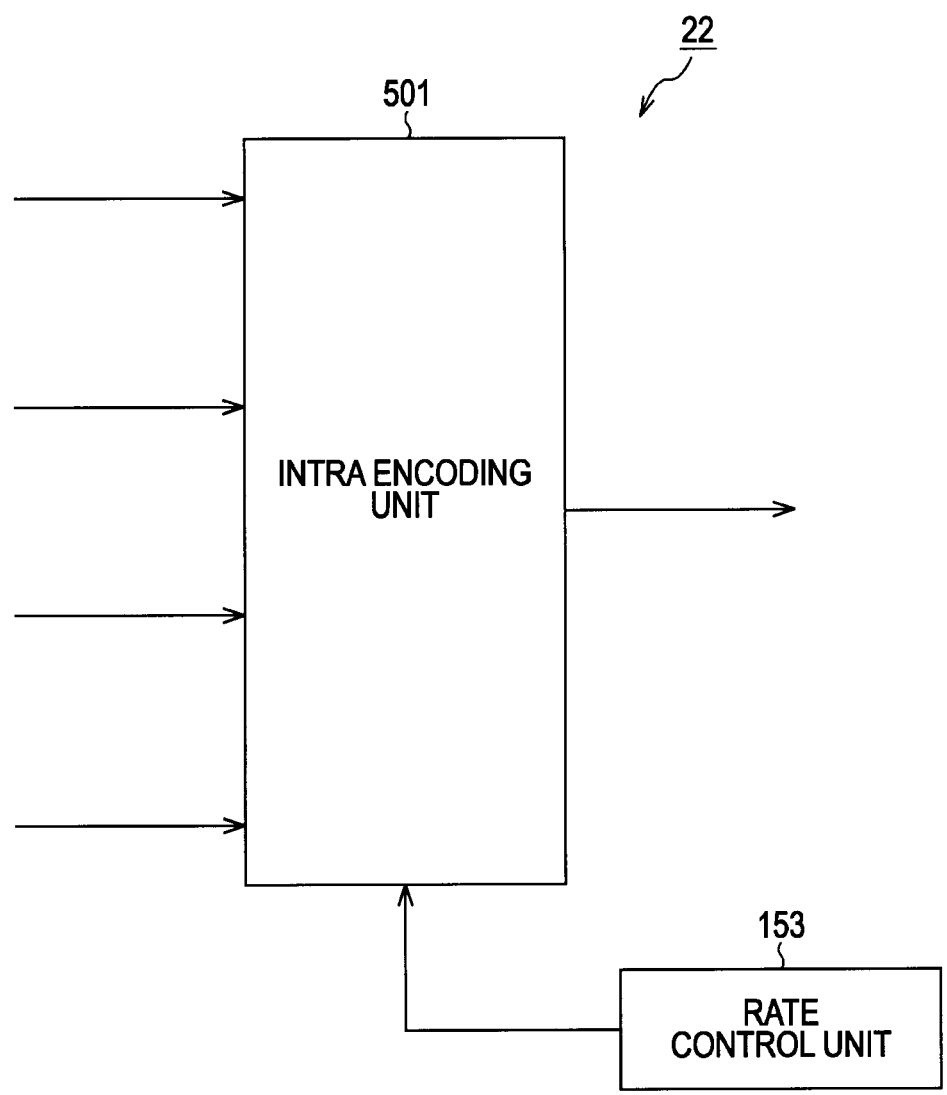
FIG. 18 is a block diagram illustrating another configuration example of the encoding unit.

Note that in FIG. 3, description has been made wherein the intra encoding unit 151 includes the intra encoders having encoding capability of 60 p (the first intra encoding unit 161 through fourth intra encoding unit 164 in the case of the example in FIG. 3), but even other than this, for example, as shown in FIG. 18, the intra encoding unit 151 may be configured of one intra encoding unit 501 having encoding probability of 240 p or more. However, in this case, as compared with the case of the example in FIG. 3, it is necessary to prepare an encoder which performs processing at a high speed (encoding capability is high), and accordingly, there is a possibility that developing cost and manufacturing cost and so forth might increase.

Figure 19:
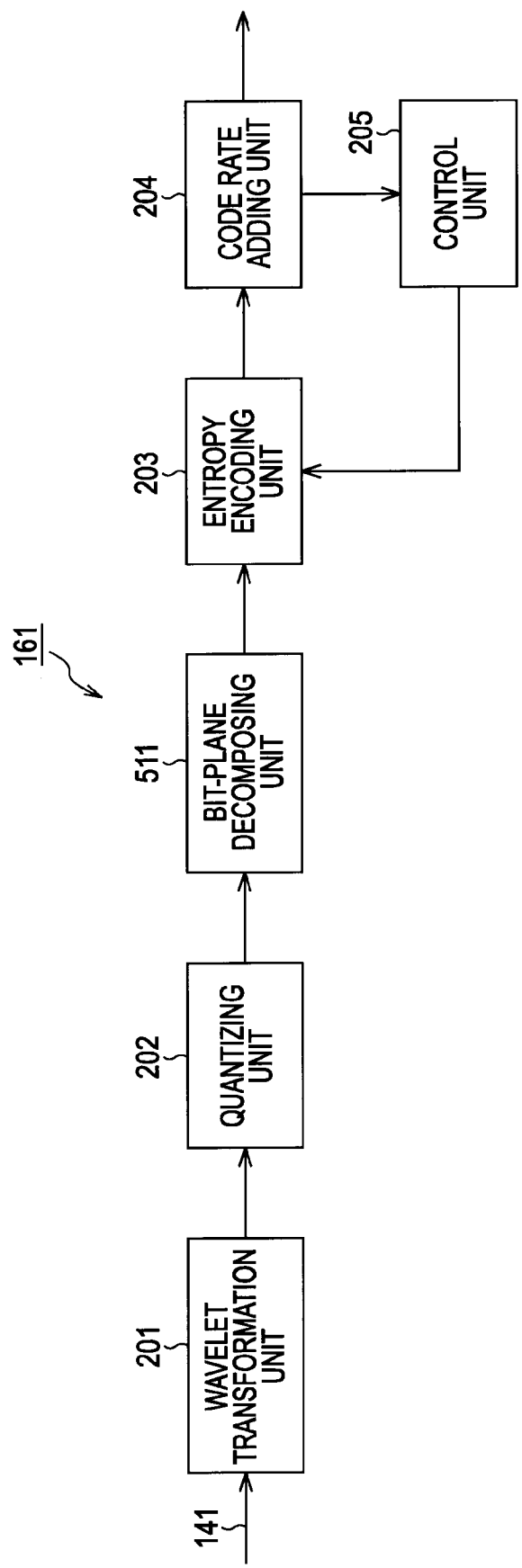
FIG. 19 is a block diagram illustrating another configuration example of the first intra encoding unit.

Also, an arrangement may be made wherein quantized coefficients are decomposed into bit planes at each intra encoder of the intra encoding unit 151. FIG. 19 is a block diagram illustrating a detailed configuration diagram of the first intra encoding unit 161 in that case. FIG. 19 is a block diagram corresponding to FIG. 4, so the same components as those in FIG. 4 are appended with the same reference numerals.

In the case of FIG. 19, the first intra encoding unit 161 includes a bit-plane decomposing unit 511 other than the components in FIG. 4. The bit-plane decomposing unit 511 decomposes the quantized coefficient generated at the quantizing unit 202 into bit planes.

Figure 20A:
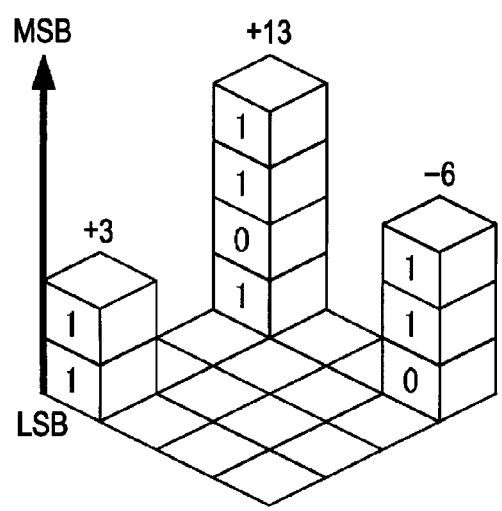
FIG. 20 is a diagram describing the concept of a bit plane.
Figure 20B:
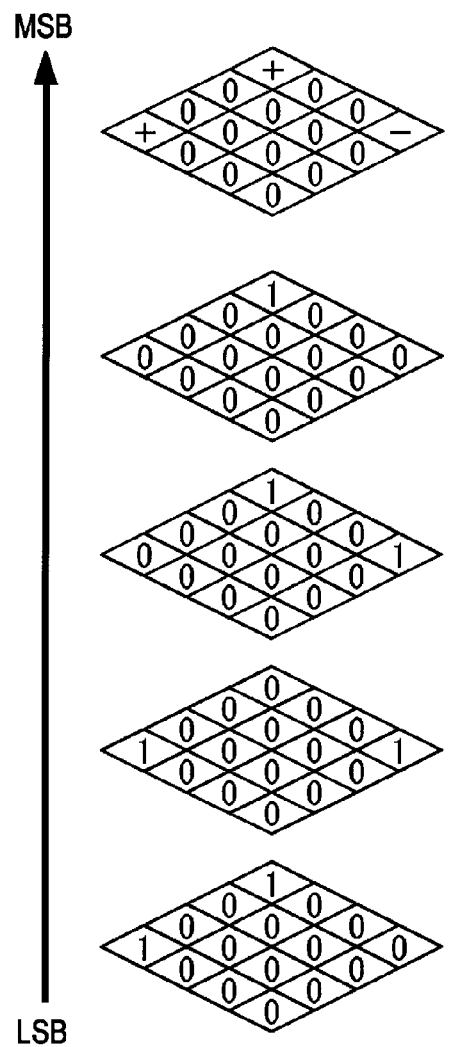

FIGS. 20A and 20B are diagrams describing the concept of a bit plane. For example, with the quantizing unit 202, if we say that the 16 pixels of 4 pixels vertical×4 pixels horizontal are taken as one block, quantized coefficients such as shown in FIG. 20A are obtained. For example, of these 16 quantized coefficients, the maximum absolute value is "+13", which is represented with "1101" in binary expression. With a bit plane, the binary expression and sign of such a quantized coefficient for each block are summarized for every grade. That is to say, the quantized coefficients shown in FIG. 20A are made up of five bit planes (one bit plane for the sign of a coefficient, and four bit planes for the absolute value of the coefficient) such as shown in FIG. 20B.

The bit-plane decomposing unit 511 supplies quantized coefficients thus decomposed into bit planes to the entropy encoding unit 203.

The entropy encoding unit 203 performs operation arranged to compress quantized coefficients decomposed into bit planes using information source compressing method. Accordingly, a code stream obtained with encoding is also divided into bit plane units.

Figure 21:
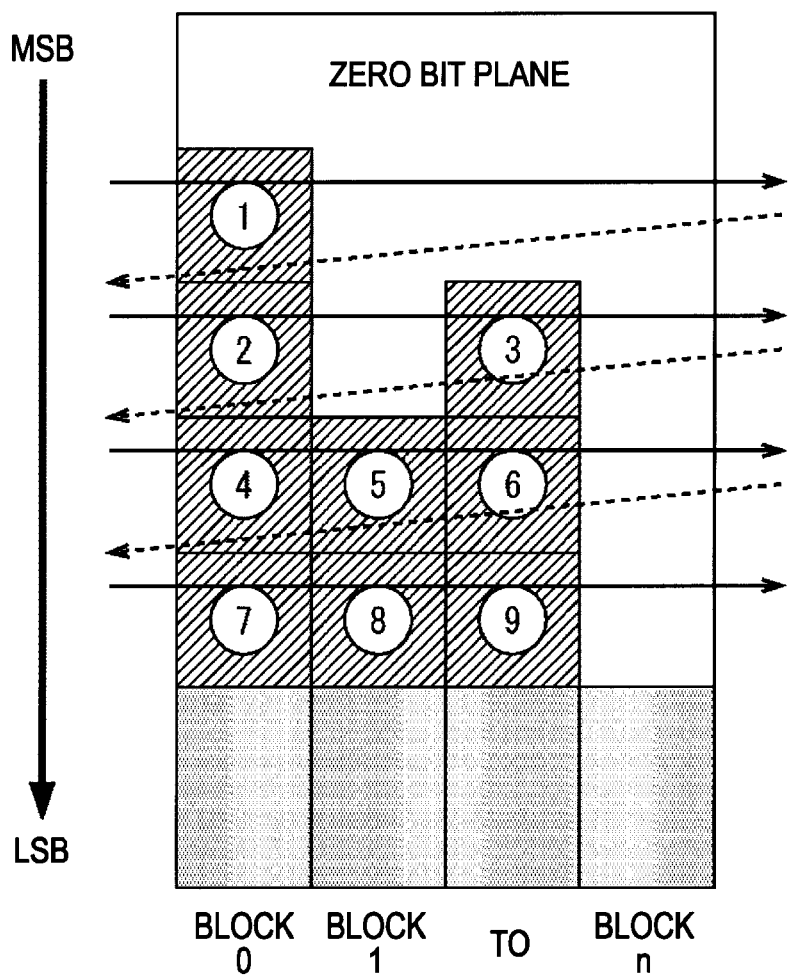
FIG. 21 is a schematic view describing an example of the order of encoding.

FIG. 21 is a schematic view describing an example of the order of encoding in the case of performing encoding for each bit plane. In FIG. 21, block 0, block 1 through block n in a horizontal axis represent block numbers. In this case, entropy encoding is performed for every bit plane of each block. For example, the entropy encoding unit 203 selects a code for every bit plane in the order from MSB (Most Significant Bit) to LSB (Least Significant Bit), accumulates a code rate, and stops encoding when reaching a target code rate.

For example, in the event that encoding is performed in increments of block without decomposing quantized coefficients into bit planes, there is a possibility that the accumulated code rate might reach the target code rate before reaching block n. That is to say, in such a case, a block of which encoding has not been performed at all occurs. However, of the MSB and the LSB, the MSB which is a high order bit of the LSB is more important than the LSB, and employing a limited code rate for the MSB contributes to improvement in image quality as compared with employing a limited code rate for the LSB.

Accordingly, as shown with the arrows and numbers in FIG. 21, with multiple blocks, the entropy encoding unit 203 performs encoding in order (number order) from a bit plane close to the MSB excluding a zero bit plane wherein all coefficients are zero, and ends encoding at the time of the accumulated code rate reaching the target code rate. In the case of the example in FIG. 21, the accumulated code rate has reached the target code rate at the time of encoding of the bit plane of number "9" ending, the entropy encoding unit 203 ends encoding at that time. Thus, the entropy encoding unit 203 can encode a high order bit of each block preferentially, which can contribute to not only improvement in image quality but also reduction of assignment of a code rate to an unnecessary zero bit plane which concentrate on a high order bit, whereby encoding efficiency can be improved.

While the case wherein the shape of a block is a rectangle has been shown above, this may be one line or multiple lines in the horizontal direction of an image.

Figure 22A:
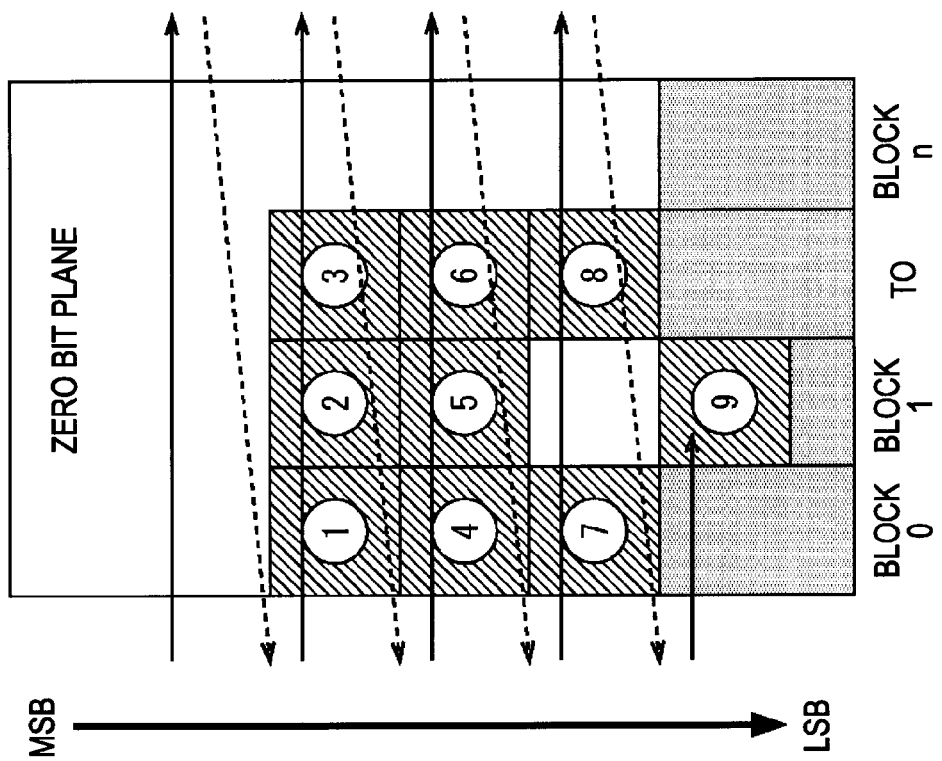
FIG. 22 is a schematic view describing another example of the order of encoding.
Figure 22B:
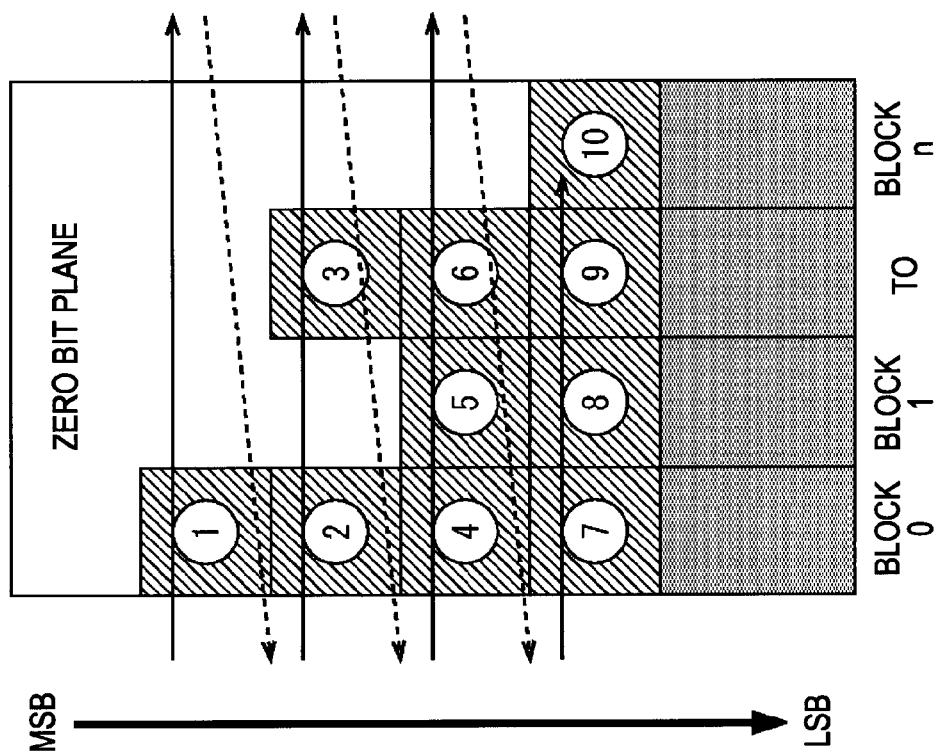

Also, in the case of encoding an addition image and subtraction image, an arrangement may be made wherein each of quantized coefficients is decomposed into bit planes, and encoded. In this case, each of target code rates is also set. In this case, the entropy encoding unit 203 performs encoding for each bit plane as described above regarding each of an addition image and subtraction image. FIG. 22A illustrates an example of the flow of encoding of an addition image, and FIG. 22B illustrates an example of the flow of encoding of a subtraction image. Thus, with an addition image and subtraction image, the bit plane structures of both mutually differ, so encoding is performed mutually independently regarding each of both, whereby the entropy encoding unit 203 can improve encoding efficiency. It is needless to say that such encoding of an addition image and such encoding of a subtraction image may be performed mutually at a different encoder.

Note that description has been made above regarding the case of encoding the two images of an addition image and a subtraction image on the convenience of description, but as described above, it is apparent that the same encoding may be performed upon the four images of the second level.

Also, it is needless to say that the entropy encoding unit 203 may be configured so as to encode an addition image and subtraction image in an integrated manner.

Figure 23:
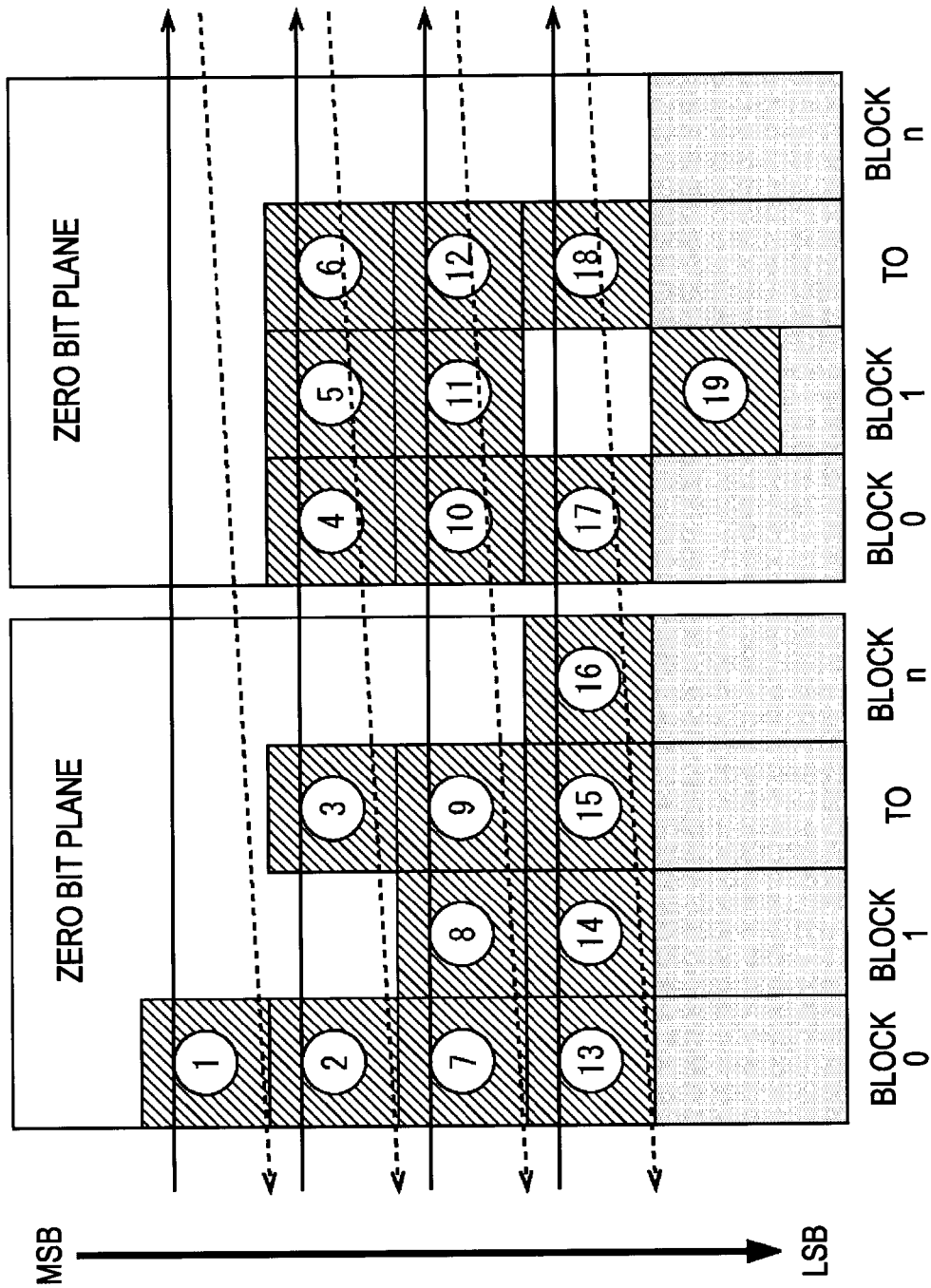
FIG. 23 is a schematic view describing yet another example of the order of encoding.

For example, the intra encoding unit 501 in FIG. 18 performs encoding operation by inputting multiple images concurrently, whereby encoding of a bit plane can be performed with an addition image and subtraction image as one processing unit, such as shown in FIG. 23. That is to say, the entropy encoding unit 203 in this case ends entropy encoding at the time of the accumulated code rate reaching the target code rate while subjecting the rectangular blocks of an addition image and subtraction image to entropy encoding in a cross-sectional manner from a high-order bit plane to a low-order direction excluding a zero bit plane.

Thus, the entropy encoding unit 203 can perform the assignment of a code rate appropriately without setting a code rate to be assigned to each of an addition image and subtraction image beforehand, whereby a quantized coefficient which greatly affects image quality can be encoded more preferentially.

Note that description has been made so far regarding the case of encoding the two images of an addition image and subtraction image on the convenience of description, but as described above, it is apparent that the same encoding can be performed upon the four images of the second level.

Also, a method arranged to perform encoding for each bit plane in such a sequence, as described with reference to FIG. 7, can be applied to the case of performing encoding from a low-frequency sub band toward a high-frequency sub band. In this case, the entropy encoding unit 203, for example, arrays blocks in sub band order such as shown in FIG. 7, and subjects all of the blocks to encoding in order from a high-order bit plane such as described with reference to FIG. 21. That is to say, the entropy encoding unit 203 encodes each order bit plane in order from a low frequency of which the energy is high toward a high frequency of which the energy is low. Accordingly, the entropy encoding unit 203 can improve encoding efficiency as compared with the case described with reference to FIG. 21. Also, in other words, the entropy encoding unit 203 encodes the bit plane of each frequency from in order from a high order toward a low order excluding a zero bit plane. Accordingly, the entropy encoding unit 203 can improve encoding efficiency, and also can further improve image quality as compared with the case described with reference to FIG. 7.

Thus, in the event of performing encoding for each bit plane, how to array blocks is arbitrary, so blocks may be arrayed in another order. For example, an arrangement may be made wherein the entropy encoding unit 203 arrays quantized coefficient blocks in the priority order such as shown in Expression (10), and subjects all of the blocks to encoding in order from a high-order bit plane such as described with reference to FIG. 21. According to such an arrangement, the entropy encoding unit 203 can improve encoding efficiency. Alternatively, an arrangement may be made wherein the entropy encoding unit 203 arrays quantized coefficient blocks in the priority order such as shown in Expression (11), and subjects all of the blocks to encoding in order from a high-order bit plane such as described with reference to FIG. 21. According to such an arrangement, the entropy encoding unit 203 can further improve subjectivity image quality.

In order to further improve subjectivity image quality, an arrangement may be made wherein the entropy encoding unit 203 arrays blocks in order such as shown with the arrows in FIG. 12, and performs encoding.

Figure 24:
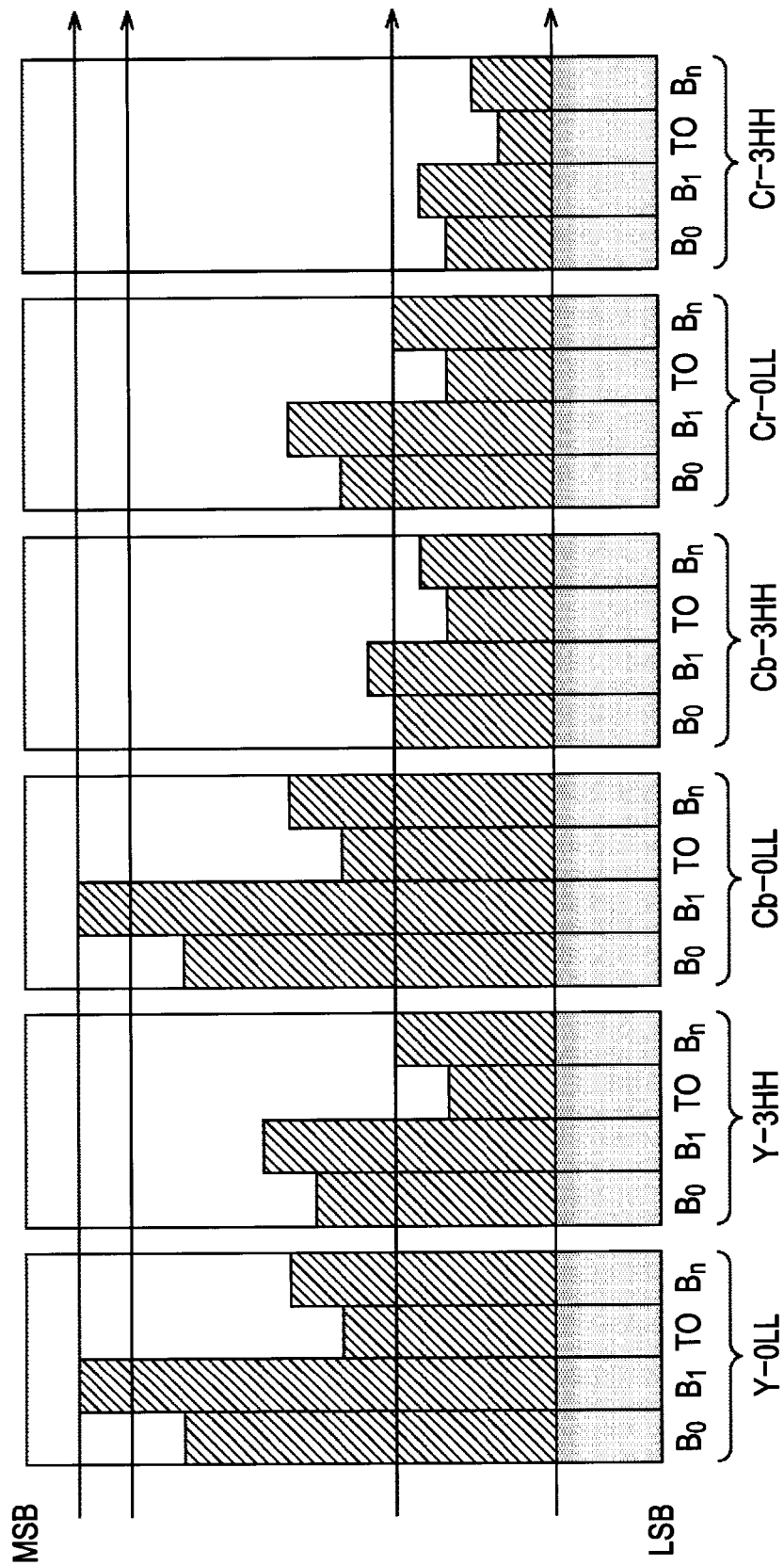
FIG. 24 is a schematic view describing yet another example of the order of encoding.

That is to say, in this case, as shown in FIG. 24, the entropy encoding unit 203 arrays blocks regarding each of a brightness component Y, color difference component Cb, and color difference component Cr in the sub band order such as shown in FIG. 12, i.e., in the order from Y-OLL which is a sub band of the brightness component Y to Cr-3HH which is a sub band of the color difference Cr, performs entropy encoding for each bit plane in order from a high-order bit plane toward a low-order bit plane excluding zero bit planes, and ends encoding at the time of the accumulated code rate reaching the target code rate. According to such an arrangement, the entropy encoding unit 203 can further improve subjectivity image quality.

Even in the event that the entropy encoding unit 203 performs encoding for each bit plane in any order such as shown in FIG. 21 through FIG. 24, the entropy decoding unit 351 performs decoding in the same order as the order thereof. That is to say, the entropy decoding unit 351 performs decoding of code streams in order such as an order generating bit planes in order from a high-order bit plane toward a low-order bit plane excluding zero bit planes.

Figure 25:
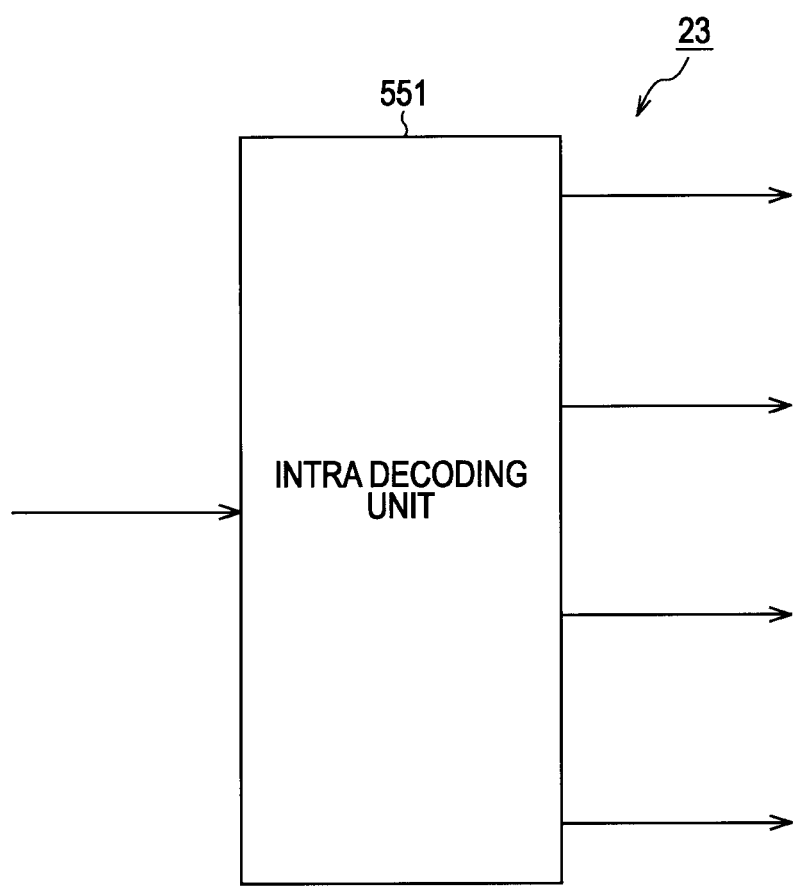
FIG. 25 is a block diagram illustrating another configuration example of the decoding unit.

As with the case of the encoding unit 22, even with the decoding unit 23, such as shown in FIG. 25, the intra decoding unit 302 may be configured of the one intra decoding unit 551 including decoding capability of 240 p or more. However, in this case, as compared with the case of the example in FIG. 9, it is necessary to prepare a decoder configured to perform processing at a high speed (of high decoding capability), there is a possibility that developing cost, manufacturing cost, and the like might increase.

Also, for example, as shown in FIG. 26, the image processing system 1 shown in FIG. 1 may have a configuration different from the example in FIG. 1. That is to say, the present invention is not restricted to the above-mentioned embodiment alone, and it is needless to say that various types of modifications may be performed without departing from the scope of the present invention.

For example, as shown in FIG. 26A, each unit of the recording-rate control unit 21, encoding unit 22, recording unit 12, decoding unit 23, and playback-rate control unit 24 may be configured as a mutually independent device. In FIG. 26A, the image processing system 1 is made up of a recording-rate control device 601, an encoding device 602, a recording device 603, a decoding device 604, and a playback-rate control device 605. The configuration and operation of each device are the same as those of each of the corresponding processing units in FIG. 1, so description thereof will be omitted.

Also, for example, as shown in FIG. 26B, an arrangement may be made wherein moving image data is only subjected to addition or subtraction between two pieces of frame data, and is recorded in a recording medium without being compressed and encoded. In this case, the image processing system 1 is made up of a recording device 611 configured to record moving image data in a recording medium 612, the recording medium 612 in which moving image data is recorded, and a playback device 613 configured to read out and play moving image data recorded in the recording medium 612.

The recording device 611 has the same configuration as the recording-rate control unit 21, which includes a recording-rate control unit 621 configured to operate in the same way as the recording-rate control unit 21, and a writing unit 622 configured to write the addition image and subtraction image output from the recording-rate control unit 621 in the recording medium 612. Also, the playback device 613 includes a reading unit 631 configured to read out an addition image and subtraction image recorded in the recording medium 612, and a playback-rate control unit 632, which has the same configuration as the playback-rate control unit 24, configured to subject the addition image and subtraction image read out from the reading unit 631 to addition and subtraction in the same way as the case of the playback-rate control unit 24, and to output moving image data at an arbitrary frame rate.

That is to say, in this case, an uncompressed addition image and subtraction image are recorded in the recording medium 612.

Also, with the example in FIG. 1, description has been made wherein an encoded code stream is recorded in a recording medium, but as shown in FIG. 26C, a code stream may be transmitted via a transmission medium.

In FIG. 26C, the image processing system 1 is made up of a sending device 641 configured to compress and encode moving image data, and transmit this to another device, a transmission medium 642 to which a code stream is transmitted, and a receiving device 643 configured to receive the code stream transmitted via the transmission medium 642.

The sending device 641 corresponds to the encoding device 11 in FIG. 1, and includes a transmission-rate control unit 651 corresponding to the recording-rate control unit 21, and an encoding unit 652 corresponding to the encoding unit 22. The transmission-rate control unit 651 has the same configuration as the recording-rate control unit 21, and operates in the same way as the recording-rate control unit 21. However, the transmission-rate control unit 651 controls not a recording rate but a frame rate at the time of transmission (transmission rate). The encoding unit 652 has the same configuration as the encoding unit 22, and operates in the same way as the encoding unit 22.

In the case of FIG. 26C, the code stream output from the encoding unit 652 of the sending device 641 is supplied to the receiving device 643 via the transmission medium 642.

The receiving device 643 corresponds to the decoding device 13 in FIG. 1, and includes a decoding unit 661 corresponding to the decoding unit 23, and a playback-rate control unit 662 corresponding to the playback-rate control unit 24. The decoding unit 661 has the same configuration as the decoding unit 23, and operates in the same way as the decoding unit 23. However, the decoding unit 661 decodes the code stream transmitted via the transmission medium 642. The playback-rate control unit 662 has the same configuration as the playback-rate control unit 24, and operates in the same way as the playback-rate control unit 24.

The above-mentioned series of processing can be executed not only by hardware, but also by software. In this case, for example, the hardware may be configured as a personal computer such as shown in FIG. 27.

In FIG. 27, the CPU (Central Processing Unit) 701 of a personal computer 700 executes various types of processing in accordance with a program stored in ROM (Read Only Memory) 702, or a program loaded in RAM (Random Access Memory) 703 from a storage unit 713. The RAM 703 is also stored with data and the like necessary for the CPU 701 executing various types of processing as appropriate.

The CPU 701, ROM 702, and RAM 703 are mutually connected via a bus 704. The bus 704 is also connected with an input/output interface 710.

The input/output interface 710 is connected with an input unit 711 made up of a keyboard, mouse, and so forth, an output unit 712 made up of a display made up of a CRT, LCD, or the like, speakers, and so forth, the storage unit 713 made up of a hard disk or the like, and a communication unit 714 made up of a modem or the like. The communication unit 714 performs communication processing via a network including the Internet.

The input/output interface 710 is also connected with a drive 715 as necessary, on which a removable medium 721 such as a magnetic disk, an optical disc, a magneto-optical disc, semiconductor memory, or the like is mounted as appropriate, and a computer program read out therefrom is installed in the storage unit 713 as necessary.

In the event of executing the above-mentioned series of processing using software, a program making up the software thereof is installed from a network or recording medium.

This recording medium is not restricted to being configured of the removable medium 721 made up of a magnetic disk (including a flexible disk), an optical disc (including CD-ROM, and DVD), a magneto-optical disc (including MD), semiconductor memory, or the like, as shown in FIG. 27 for example, wherein a program to be distributed to a user is recorded separately from the device main unit, but also can be configured of the ROM 702, a hard disk included in the storage unit 713, or the like, in which is installed a program to be distributed to a user in a state of being built in the device main unit beforehand.

Note that with the present Specification, steps describing a program to be recorded in a recording medium include not only processing to be performed in time-sequence following the sequence described, but also processing executed in parallel or individually without necessarily being processed in time-sequence.

Also, with the present Specification, the term "system" means the entirety of multiple devices (or apparatuses).

Note that with the above description, a configuration described as one device may be divided, and configured as multiple devices. Conversely, with the above description, configurations as described as multiple devices may be integrated, and configured as one device. Also, it is needless to say that a configuration other than the above-mentioned configurations may be provided with the configuration of each of the above devices. Further, as long as the configuration and operation as the entire system are substantially the same, a part of the configuration of a certain device may be included in the configuration of another device.

Also, with the above-mentioned embodiment, description has been made using the JPEG 2000 system as an image compression system, but the present invention is not restricted to this, and for example, the present invention can be applied to the case of another image compression system such as JPEG, MPEG (Moving Picture Experts Group), or the like.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device configured to process moving image data, said information processing device comprising:
a plurality of calculating units configured to transform a frame rate, by each of the plurality of calculating units subjecting two pieces of frame data to both addition and subtraction, each of the plurality of calculating units including an adder to perform said addition and a subtractor to perform said subtraction; and
a control unit configured to control said plurality of calculating units to subject each frame data of said moving image data to said addition and said subtraction by a number of times necessary for transforming the frame rate of said moving image data into a specified rate, wherein
said plurality of calculating units are mutually serially connected, a calculating unit of a second stage and thereafter are configured to add and subtract to and from calculation results of a calculating unit of a preceding stage, and
said control unit is configured to control a calculating unit of a first stage through a stage where said moving image data of a specified frame rate is obtained, of said plurality of calculating units serially connected, to perform said addition and said subtraction.

2. The information processing device according to claim 1, wherein the calculating unit of the first stage, of said plurality of calculating units serially connected, is configured to subject moving image data of which the frame rate is decreased due to said addition and said subtraction to said addition and said subtraction;
and wherein each calculating unit performs said addition and said subtraction, thereby transforming said frame rate to double.

3. The information processing device according to claim 1, further comprising:
a decoding unit configured to decode a code stream which is encoded moving image data;
wherein said plurality of calculating units are configured to subject each frame data of said moving image data, which is obtained by being controlled by said control unit, and decoded by said decoding unit, to said addition and said subtraction.

4. The information processing device according to claim 3, wherein said decoding unit is configured to decode said code stream at a speed corresponding to the frame rate of moving image data obtained with the calculation of said plurality of calculating units.

5. The information processing device according to claim 3, wherein said decoding unit includes
an entropy decoding unit configured to generate a quantized coefficient from said code stream,
an inverse quantizing unit configured to transform said quantized coefficient to generate a predetermined filter factor, and
an inverse filtering unit configured to subject said filter factor to inverse filtering to generate a decoded image.

6. The information processing device according to claim 5, wherein said entropy decoding unit is configured to decode each of the code stream of an addition image, and the code stream of a subtraction image mutually in an independent manner in order to generate a quantized coefficient from the most significant bit position to a lower bit direction.

7. The information processing device according to claim 5, wherein said entropy decoding unit is configured to integrate the code stream of an addition image, and the code stream of a subtraction image, and to decode the overall of the integrated code stream in order to generate a quantized coefficient from the most significant bit position to a lower bit direction.

8. The information processing device according to claim 5, wherein said entropy decoding unit is configured to decode said code stream to generate the quantized coefficient of the same bit position in order from a sub band of a lowest level toward a sub band of a highest level.

9. The information processing device according to claim 5, wherein said entropy decoding unit is configured to decode said code stream to generate the quantized coefficient of the same bit position in order from a brightness component to a color difference component.

10. An information processing method for processing moving image data, the information processing method comprising the steps of:
transforming, with a plurality of calculations, a frame rate, by the plurality of calculations subjecting two pieces of frame data to addition and subtraction; and
controlling said plurality of calculations to subject each frame data of said moving image data to at least one of said addition and said subtraction by a number of times necessary for transforming the frame rate of said moving image data into a specified rate, wherein
said plurality of calculations are mutually serially performed, a calculation of a second stage and thereafter add or subtract to or from calculation results of a calculation of a preceding stage, and
said controlling step controls a calculation of a first stage through a stage where said moving image data of a specified frame rate is obtained, of said plurality of calculations serially performed, to perform at least one of said addition and said subtraction.

11. An information processing device configured to process moving image data, said information processing device comprising:
a plurality of calculating means for transforming a frame rate, by the plurality of calculating means subjecting two pieces of frame data to addition and subtraction; and
control means for controlling said plurality of calculating means to subject each frame data of said moving image data to at least one of said addition and said subtraction by a number of times necessary for transforming the frame rate of said moving image data into a specified rate, wherein
said plurality of calculating means are serially connected, a calculating means of a second stage and thereafter are configured to add or subtract to or from calculation results of a calculating means of a preceding stage, and
said control means controls a calculating means of a first stage through a stage where said moving image data of a specified frame rate is obtained, of said plurality of calculating means serially connected, to perform at least one of said addition and said subtraction.

12. The information processing device according to claim 1, wherein each of the plurality of calculating units includes a plurality of both adders and subtractors.

* * * * *